United States Patent [19]

Hochsprung et al.

[11] 4,188,624

[45] Feb. 12, 1980

[54] METHOD AND APPARATUS FOR MONITORING FLUID FLOW THROUGH A DRILL STRING

[75] Inventors: Dennis H. Hochsprung, Houston; Alan C. Wright, Bellaire; Robert I. Annas, Spring; Pat W. Purcell, Houston, all of Tex.

[73] Assignee: NL Industries, Inc., New York, N.Y.

[21] Appl. No.: 921,100

[22] Filed: Jun. 30, 1978

[51] Int. Cl.$^2$ ............................................ G08B 19/00
[52] U.S. Cl. ...................................... 340/606; 340/611
[58] Field of Search ................. 340/18 CM, 606, 608, 340/609, 611, 626; 175/48

[56] References Cited

U.S. PATENT DOCUMENTS 3,800,277  3/1974  Patton ............................. 175/48 X

OTHER PUBLICATIONS

Geolograph/Medearis, *World Wide Equip. Ctlg.*, pp. 4-21 (1978).
Geolograph/Medearis, *Export Prices*, (1978).
Geolograph Company, *Recorders, etc.*, pp. 2-5 (1978).
Moor, Preson L., *Drilling Practices Manual*, Petroleum Publishing Company, Tulsa, Oklahoma, Chapter 7, *Rotary Drilling Hydraulics*, pp. 94-105.

*Primary Examiner*—Harold I. Pitts
*Attorney, Agent, or Firm*—Arnold, White & Durkee

[57] ABSTRACT

A method and apparatus are disclosed for monitoring fluid flow through a drilling string in order to detect a wash-out or a restriction. The apparatus includes circuitry for sensing the rate of pumping of a fluid, circuitry for sensing the pressure of the fluid being pumped, a function generator to process a pressure signal and a pump rate signal and generate a fluid flow indication signal, circuitry to actuate an alarm, and an alarm. The method includes sensing the pumping rate, sensing the pressure, and generating a fluid flow indication signal that gives an indication of the relationship between the pumping rate and pressure.

26 Claims, 9 Drawing Figures

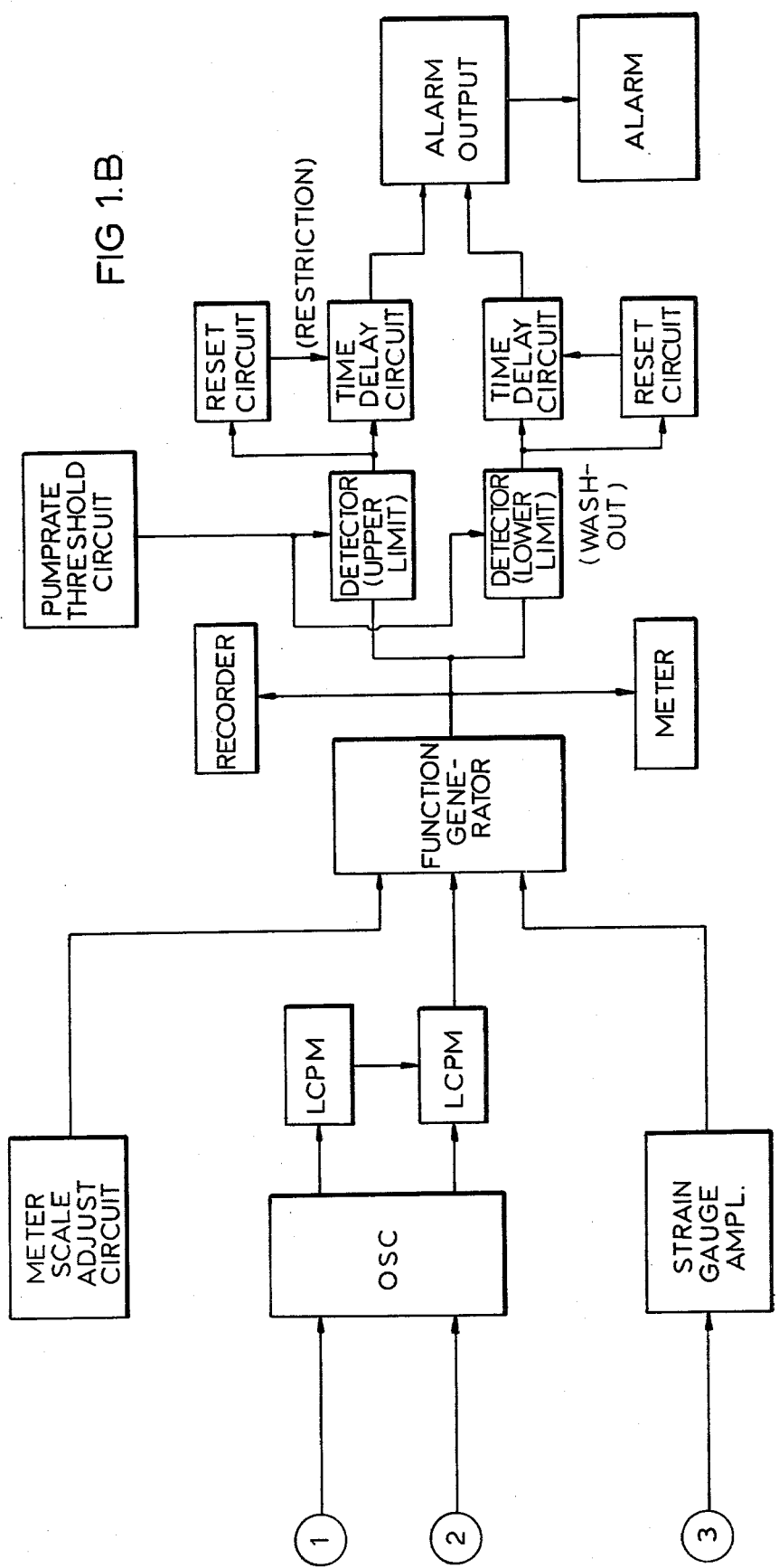
FIG 1.B

METHOD AND APPARATUS FOR MONITORING FLUID FLOW THROUGH A DRILL STRING

BACKGROUND OF THE INVENTION

This invention relates generally to a novel method and apparatus for monitoring fluid flow through a drilling string. More particularly, this invention concerns an apparatus that monitors the rate of pumping fluid through a drilling string and the pressure of the fluid being pumped and generates an alarm when the relationship between the pumping rate and the pressure deviates beyond predetermined limits in order to detect a wash-out or a restriction.

In the drilling of an oil well, drilling fluid is used to transport the cuttings and other debris from the region around the drilling bit to the surface. Drilling fluid, called "mud" in the drilling industry, ordinarily comprises a mixture of weighting material, clays, chemicals, and water or oil. Mud accounts for a major portion of both equipment and cost to drill an oil well. The mud serves two primary functions in a drilling operation. Firstly, the weight of the mud may be used to achieve at least a partial hydrostatic balance of down-hole pressure. Secondly, the mud is used as a transportation medium to convey cuttings to the surface. Ordinarily, mud is circulated down through a drilling string, through ports in a drilling bit and up the annulus of the bore to the surface.

In a drilling operation, the bit may penetrate into highly porous regions which might absorb the mud being circulated. The loss of fluid in the circulation system is ordinarily referred to as "loss-of-return." Inasmuch as drilling fluid comprises a substantial portion of economic investment in a drilling operation, it is vitally important to the economic success of an operation to know immediately when a loss-of-return occurs. If mud pumping equipment is shut down relatively soon after a loss-of-return occurs, the loss of fluid from the circulation system may be minimized. However, if mud pumping equipment fails to be shut down within a short period of time, the entire quantity of mud in a circulation system may be pumped into the porous region with significant adverse economic consequences.

Also errosion of other factors may cause a break in the drill string resulting in a loss of circulating pressure as well as flow of drilling mud from the high pressure interior of the drill string to the lower pressure area of the annulus. This flow through the drill string, if allowed to continue, can and often does result in separation of the drill string. The retrieval of the separated portion of the drill string is a timely and often costly process. Early detection of wash-out often can and does prevent this loss of sections of drill string, commonly referred to as twist-offs.

Of independent significance is the occurrence of some plugging action in the circulation system. That is, an impediment of some sort may be interposed in the circulation system, say, in the ports in the bit, with a result that the pressure within the pumping system rapidly rises. Such an occurrence is ordinarily referred to as a "restriction" with the result that pumping equipment may be damaged or even destroyed. It will be appreciated that the damaging of mud pumping equipment is not only expensive, but may interrupt normal drilling operations. It has been found that down-time under such circumstances represents severe economic losses to the drilling operation.

Therefore, it has been found desirable to in some way monitor the circulation of drilling fluid in an attempt to minimize the adverse consequences resulting from wash-outs and restrictions.

In the past it has been common to monitor the pumping rate and pressure of the fluid being pumped. While prior art arrangements have exhibited a degree of utility by giving some indication of the pumping rate and pressure, room for significant improvement remains. Pump rate and pressure traditionally have been displayed by conventional meters. A trained operator was needed to monitor the meter displays and observe any fluctuations in the readings. Successful drilling operations depended upon the operator's experience and judgment in interpreting the meter readings and taking appropriate action in the event of any perceived abnormalities. Such a method of monitoring fluid flow may result in a failure to detect abnormal fluid flow due to the inexperience, inattention or error of the operator. Moreover, such a method for monitoring fluid flow may depend for its success upon the availability of trained operators.

Abnormalities of fluid flow can be sudden and severe. For example, the drill bit may encounter an underground river which might absorb most of the fluid in the circulation system within minutes. If immediate action is not taken, severe economic consequences could result.

In the past, transducers have been placed on a drilling apparatus to generate electrical signals which were fed into a mini computer. The mini computer utilized a computer program to calculate a theoretical value for the pumping rate which was then displayed to an operator. However, the effectiveness of such a mini computer monitoring system would depend upon the skill of the operator. In addition, the success of such a system may depend upon the availability of highly trained computer operators.

The mini computer apparatus may be relatively bulky and may require special handling and a special environment. For example, known mini computers occupy a cubic space of about 2½ feet on each side. Installation of the mini computer apparatus may be relatively complicated and the mini computer apparatus may be relatively heavy. An air conditioned environment may be required to maintain the stability of the complex electronic circuitry contained therein, and, in general, a mini computer apparatus will be relatively expensive to either own or lease. Additionally, a mini computer apparatus requires relatively large amounts of direct current power. Such power is most often provided by gasoline powered generators, whose output must be filtered by expensive filtering networks.

The problems enumerated in the foregoing are not intended to be exhaustive but rather are among many which tend to impair the effectiveness of previously known methods of and apparatus for monitoring fluid flow through a drilling apparatus. Other noteworthy problems may exist; however, those presented above should be sufficient to demonstrate that operator dependent monitoring methods and mini computer dependent monitoring apparatus appearing in the prior art have not been altogether satisfactory.

OBJECTS AND SUMMARY OF A PREFERRED EMBODIMENT OF THE INVENTION

Recognizing the need for an improved method and apparatus for monitoring fluid flow through a drilling string, it is therefore a general object of the present invention to provide a novel method and apparatus for monitoring such fluid flow which minimizes or reduces the problems of the type previously noted.

It is a more particular object of the present invention to provide a novel apparatus which does not require constant attention. Accordingly, it is an object of the invention to provide a novel apparatus having a capability to constantly monitor pumping rate and pressure, promptly detect any abnormalities in the fluid flow and generate an alarm.

It is another object of the present invention to provide a novel apparatus which overcomes the problems of operator inattention facilitating the use of operators who may perform other duties and who may be required to respond only in the event of a washout or restriction.

It is a further object of the invention to provide a novel apparatus having means for monitoring fluid flow and which does not require a highly skilled operator for its success. Accordingly, it is an object of the present invention to provide a novel apparatus that can be operated by relatively inexperienced individuals. Moreover, the problems of errors of judgment are substantially minimized by providing an apparatus that automatically generates an alarm signal when something is wrong. Thus it is an object to provide a novel apparatus that can alert an inexperienced operator to the existence of trouble in a mud circulation system without the requirement that he be skilled or experienced in detecting such trouble promptly.

It is a yet further object of the present invention to provide a novel apparatus that will detect abnormal fluid flow promptly. Thus it is an object of the present invention to minimize problems which may result from the inattention of an operator.

It is a still further object of the present invention to provide a novel apparatus for monitoring fluid flow that is small, light-weight and easy to install. A preferred embodiment of the present invention weighs little, compared to known devices, occupies a cubic space of approximately 15" on each side, and requires only two inputs for its proper operation. It can be appreciated that the invention could be embodied in an arrangement that may be even smaller.

It is a yet still further object of the present invention to provide a novel apparatus that can withstand a hostile environment. The search for scarce natural resources in recent times has taken drilling operations to hostile environments like the frigid arctic tundra of Alaska and lonely isolated drilling platforms on the high seas. Thus it is an object of the present invention to provide an apparatus that does not require air conditioning to function reliably. A preferred embodiment of the present invention may operate between temperature extremes of substantially zero degrees centigrade and 85 degrees centigrade.

It is another object of the invention to provide a relatively inexpensive means for monitoring fluid flow. The entire construction cost of the preferred embodiment of the invention may be less than the cost to lease a mini computer system for a single day. In many drilling operations, the benefits obtained from using a mini computer system may not justify the tremendous relative expense of such a system. However, the present invention may be easily justifiable in view of its relatively inexpensive cost of construction. The disclosed invention may minimize problems associated with prior art devices by drawing less power and requiring less expensive filtering.

A presently preferred embodiment of the invention intended to substantially accomplish the foregoing objects includes circuitry to sense a pressure in a mud circulation system, circuitry to sense a rate of pumping of a mud pump, and circuitry for processing signals that vary in relation to the pressure and the rate of pumping for producing an alarm whenever the pressure and rate of pumping that are sensed are related in a way that indicates that the flow of fluid in the mud circulation system is significantly abnormal. An alarm would be produced whenever a wash-out or a restriction was encountered during drilling operations.

It can be appreciated that, as an alternative to producing an alarm, the present invention may be used to actuate conventional switching equipment to stop pumping in a mud circulation system.

More particularly, a preferred embodiment of the invention includes a transducer coupled with an amplifier that produces a signal that varies in proportion to pressure in a stand pipe. One or more transducers are coupled to circuitry that develops a signal that is proportional to the pumping rate. These signals are fed into a function generator which produces a fluid flow indication signal. This fluid flow indication signal remains constant for normal pump rate-pressure relationships and gives an indication of whether the fluid is flowing through the drilling string in a normal manner. This signal may be monitored directly or it may be fed into an alarm circuit. Alternatively, this signal may be used to actuate conventional switching equipment which stops pumping in the mud circulation system.

In a preferred embodiment, the fluid flow indication signal is fed into two detectors. The first detector compares the fluid flow indication signal with a lower limit threshold and gives a first indication signal when the fluid flow indication signal drops below said threshold. The first indication signal is fed into a first time delay circuit that generates a first alarm initiation signal after a predetermined time delay. The time delay circuit prevents transitory aberrations in the fluid flow from generating false alarms. The first alarm initiation signal is fed into an alarm output that generates an alarm signal.

In a similar manner, the fluid flow indication signal is also fed into a second detector which compares the fluid flow indication signal with an upper threshold. If the fluid flow indication signal exceeds the upper threshold, then a second indication signal is generated. This second indication signal is fed into a second time delay circuit which, after a predetermined period of time, generates a second alarm initiation signal which is fed into an alarm output which generates an alarm signal.

A first and a second reset circuit is responsive to said first and said second indication signal respectively and generates a first and a second reset signal respectively. These reset circuits reset said first and second time delay circuits respectively to prevent the generation of an alarm initiation signal for transitory aberrations in the fluid flow.

Examples of the more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Other objects, features, and advantage of the present invention will become apparent with reference to the following detailed description of a preferred embodiment thereof in connection with the accompanying drawings, wherein light reference numerals have been applied to like elements, in which:

DETAILED DESCRIPTION OF A PREFERRED EMBODIMENT OF THE INVENTION

The present invention is disclosed primarily in connection with a system for detecting the presence of a wash-out or restriction in a drilling apparatus. However, the invention is not so limited in terms of its use. For example, the invention may be used anywhere fluid is being pumped through pipes. Additionally, the invention may be used to detect defective pumps. The invention produces a fluid flow indication signal that indicate the relationship between the fluid pressure and the pumping rate. In the event that a pump fails to function properly, the fluid flow indication signal may show an abnormal relationship between the fluid pressure and the pumping rate.

The invention produces an alarm signal whenever the relationship between the fluid pressure and the pumping rate is substantially abnormal for a substantial period of time. The alarm signal may actuate an alarm, or may actuate conventional switching equipment to shut down pumps, or both.

Figure 1A:
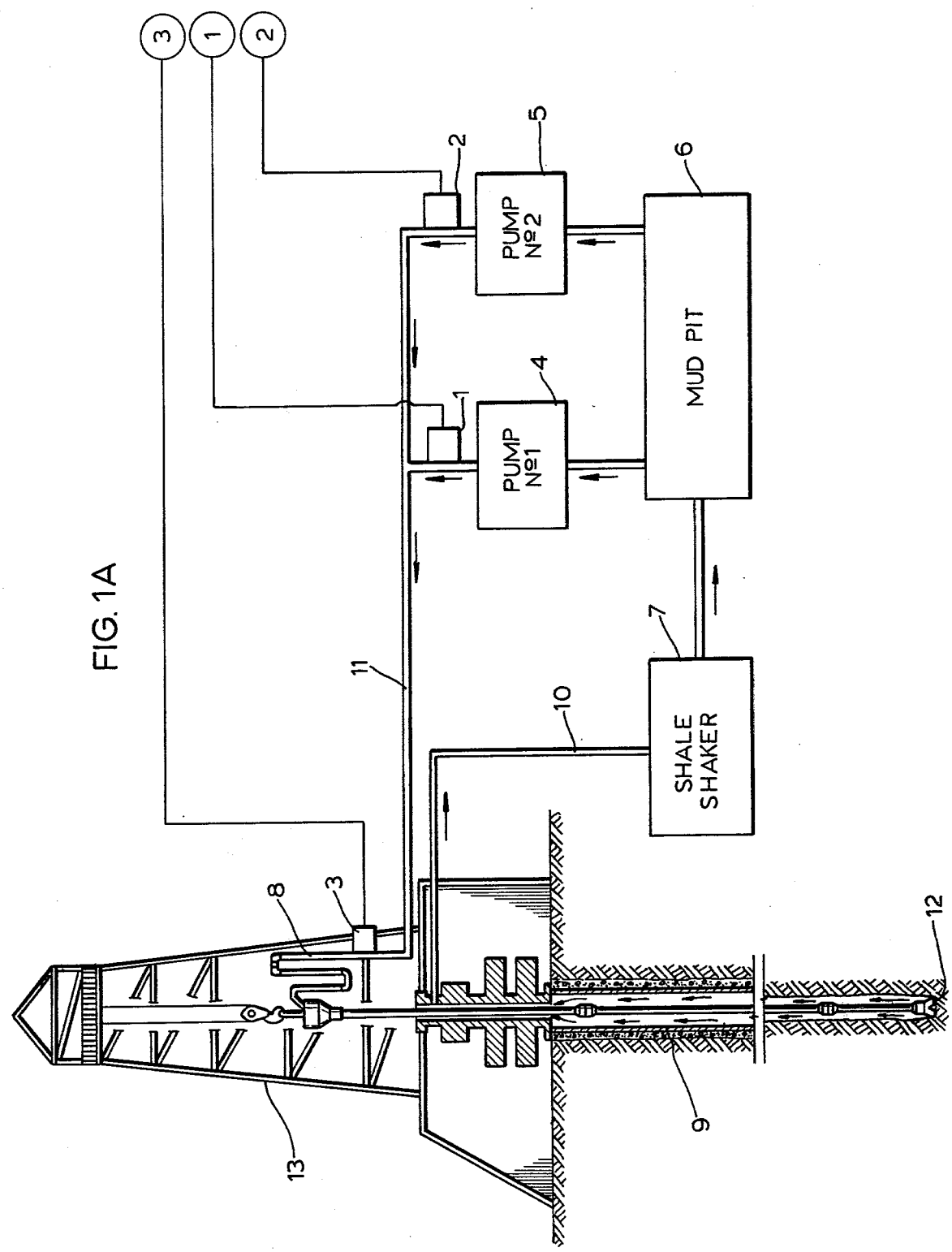
FIG. 1, shown in parts as FIG. 1A and FIG. 1B, depicts a partial schematic diagram of an environment in which a preferred embodiment of the present invention has achieved significant utility.

Referring now to the drawings, F1, shown as FIG. 1A and FIG. 1B, 1 illustrates an exemplary setting for employing the invention. This setting includes a drilling apparatus 13, shown in FIG. 1A, through which is pumped a drilling fluid generally referred to in the art as "mud." From a mud pit 6, the fluid is pumped by a first pump 4 and a second pump 5 through a standpipe 8, down through a drilling string 9, and out ports in a bit 12. The mud then carries cuttings back up and out through pipe 10. A shaker 7 removes the cuttings and other debris and then directs the mud into a mud pit 6.

A first transducer 1 senses the pumping rate of the first pump 4 and generates a signal related to a pumping rate of the first pump 4. In a similar manner, a second transducer 2 senses the pumping rate of the second pump 5 and generates a signal that is related to the pumping rate of the second pump 5. A third transducer 3 senses pressure and generates a signal related to pressure.

The third transducer 3 is shown connected at the standpipe 8. A transducer for measuring pressure is normally located on a standpipe in a corner of a drilling rig mast. It can be appreciated that the third transducer 3 may be connected at any point that will enable the third transducer 3 to sense pressure.

FIG. 1B is connected to FIG. 1A at points A, B, and C. Referring now to FIG. 1B, it may be seen that a signal from the first transducer 1 is fed in at point A; a signal from the second transducer 2 is fed in at point B; a signal from the third transducer 3 is fed in at point C.

The signal at the first transducer 1 is fed into an oscillator 14, and the signal from the second transducer 2 is fed into the oscillator 14. A signal from the third transducer 3 is fed into a strain gauge amplifier 15. In a preferred embodiment, the first and second transducers 1 and 2 are essentially comprised of switches that switch on and off with each stroke.

An oscillator 14 accepts the signals from the first and second pump transducers 1 and 2 and produces an output that is fed into a first and second linear counts per minute (LCPM) circuit. The first LCPM 16 accepts a signal from the oscillator 14 and feeds it into the second LCPM 17. The second LCPM 17 accepts a signal from the oscillator 14, processes it in the same manner as the first LCPM 16, and then sums it with the signal from the first LCPM 16. The second LCPM 17 produces a first input signal for the signal generator 18. The third transducer 3 produces a signal that is fed into the strain gauge amplifier 15. The strain gauge amplifier 15 then produces a second input signal that is fed into the signal generator 18.

The first and second input signals are processed by the signal generator 18 to produce a fluid flow indication signal. This fluid flow indication signal is fed into a first detector 19. The first detector 19 also responds to a signal from a pump rate threshold 27. The first detector 19 produces a first indication signal that is fed into a first reset circuit 21 and a first time delay circuit 20. The first time delay circuit 20 produces a signal that is fed into an alarm output 22. The first reset circuit generates a first reset signal that is fed into the first time delay circuit 20.

The fluid flow indication signal is also fed into a second detector 23. The second detector 23 also receives a signal from the pump rate threshold 27. The second detector 23 produces a signal that is fed into a second reset circuit 25 and a second time delay circuit 24. The second time delay circuit 24 produces a signal that is fed into the alarm output 22. The alarm output 22 generates an alarm signal.

A second reset circuit 25 produces a second reset signal that is fed into the second time delay circuit 24. The first reset circuit 21 produces a signal that is fed into the first time delay 20. A meter scale adjust circuit 30 generates a signal that is fed into the signal generator 18. The fluid flow indication signal can be fed out into a meter 28 or a recorder 29.

In a preferred embodiment, the first transducer 1 and the second transducer 2 shown in FIG. 1A are essentially switches that make and break in step to the pumping rate of the pump 4 and the pump 5, respectively. The oscillator 14 accepts signals from the first transducer 1 and the second transducer 2 and produces an output that varies on and off in step with the signals from the respective transducers. It can be appreciated that the signal generated by the oscillator 14 has a substantially constant magnitude and is of a frequency that varies in proportion to the rate of pumping. The first LCPM circuit 16 essentially converts this signal to a signal whose magnitude varies in a substantially linearly fashion in proportion to the rate of pumping. It can be appreciated that the first LCPM 16 or the second LCPM 17, or both, may be a frequency-to-voltage converter. The second LCPM 17 performs a similar function on the signal generated by the oscillator 14 for the second transducer 2. The second LCPM 17 further sums the output from its own circuitry with the output from the first LCPM 16 and produces a first input signal whose magnitude varies in relation to the combined rate of pumping of both the pump 4 and the pump 5 shown in FIG. 1A.

The third transducer 3 in the preferred embodiment sends a signal to the strain gauge applifier 15. It can be appreciated that the third transducer 3 might be a strain gauge. The strain gauge applifier 15 applifies the signal from the third transducer 3 in order to bring it up to a level that is more easily manipulated by the signal generator 18. The strain gauge applifier 15 in FIG. 1B generates a second input signal whose magnitude varies in relation to the pressure in the standpipe 8 in FIG. 1A.

The signal generator 18 responds to the first and second input signal and produces a fluid flow indication signal. This fluid flow indication signal should remain substantially constant as long as the magnitude of the first input signal is related to the magnitude of the second input signal in a way that is directly analogous to the proper relationship between the pumping rate and the fluid pressure in a drilling apparatus.

It can be appreciated that direct monitoring of said fluid flow indication signal may be desirable because it gives an indication of whether the fluid flow through a drilling apparatus is normal. Thus said fluid flow indication signal may be outputted directly to a meter 28. If a record of the variations of said fluid flow indication signal over time is desired, the fluid flow indication signal may be outputted to a recorder 29. It can be appreciated that the meter 28 and the recorder 29 are not essential for the proper operation of the preferred embodiment of the invention.

The meter scale adjust circuit 30 provides a signal that is inputted into the signal generator 18. The meter scale adjust circuit 30 actually provides a scaling factor that is a convenient means for adjusting the nominal level of the fluid flow indication signal during normal operation. In a preferred embodiment, the meter scale adjust circuit 30 is adjusted to provide a fluid flow indication signal of substantially 5 volts during normal drilling operation. This adjustment allows for the proper operation of the alarm circuitry under various operating conditions.

The fluid flow indication signal will thus deviate above or below its nominal value whenever the relationship between the fluid pressure and the pumping rate in a drilling string is abnormal. The first detector 19 detects any deviation in the fluid flow indication signal below a predetermined lower reference level. The second detector 23 detects any deviation of the fluid flow indication above a predetermined upper reference level.

Reference levels are set in order to give an indication signal when the relationship between the fluid pressure and the pumping rate is significantly abnormal. Reference levels are set so that minor fluctuations in the relationship between the fluid pressure and the pumping rate will not generate an indication signal. In a preferred embodiment, the predetermined lower reference level is set at 4 volts, and the predetermined upper reference level is set at 6 volts.

The first input signal is also fed into the pump rate threshold circuit 27. The pump rate threshold circuit 27 generates what is essentially an enabling signal that disables the second detector 23 and the first detector 19 whenever the pumps are shut down. The first input signal has to rise above a threshold value before the pump rate threshold 27 will generate an enabling signal. Thus, when the pumps are shut off, no enabling signal will be generated. The second detector 23 and the first detector 19, therefore, will be disabled from generating an alarm initiation signal when the pumps are shut down.

In a preferred embodiment, the pump rate threshold circuit 27 generates an enabling signal only when the pumping rate is greater than 20 strokes per minute.

If the fluid flow indication signal drops below the lower reference level, the first detector 19 will generate a first indication signal. The first indication signal may be an indication of a wash-out. The first indication signal is fed into the first reset circuit 21 and the first time delay circuit 20. If the first indication signal remains for a predetermined period of time, the first time delay circuit 20 will generate a first alarm initiation signal that is fed into the alarm output 22. If the first indication signal disappears before the predetermined period of time, the first reset circuit 21 will generate a first reset signal that will reset the first time delay circuit 20 and prevent the generation of a first alarm initiation signal.

It will be appreciated that when the pumping rate increases or decreases, the pressure of the fluid being pumped may not immediately rise or drop to a value that indicates a normal relationship between the pressure and the pumping rate. The pressure normally lags behind changes in the pumping rate. Thus, the first time delay circuit 20 and, similarly, the second time delay circuit 24, produce an alarm initiation signal only after a predetermined period of time. Said predetermined period of time is established to accommodate the normal response delay between a change in pumping rate and pressure variations caused thereby. In a preferred embodiment, the predetermined time delay is about 7 seconds.

If the first time delay circuit 20 is omitted from an embodiment of the invention, an alarm initiation signal may be generated when the pumping rate is changed intentionally because the pressure will change to a normal level in relation to the changed pumping rate only after a time delay.

In a like manner, the second detector 23 responds to an input from the fluid flow indication signal and generates a second indication signal whenever said fluid flow indication signal rises above a predetermined upper reference level. The second detector 23 will be inhibited by the pump rate threshold 27 whenever said first input signal is below a predetermined level. Thus, the second indication signal will not be generated when the pumps are shut off. The second indication signal is fed into the second reset circuit 25 and the second time delay circuit 24. The second time delay circuit 24 will generate a second alarm initiation signal after a predetermined period of time unless reset by a second reset signal generated by the second reset circuit 25. Thus, if the second indication signal disappears from the second detector 23, the second rest circuit 25 will reset the second time delay circuit 24 and prevent the generation of a second alarm initiation signal.

If no second reset signal is generated, after the predetermined period of time, the second time delay circuit 24 will generate a second alarm initiation signal that will be fed into the alarm output 22 and an alarm signal will be generated. In a preferred embodiment, the disappearance of the second indication signal will be detected by the second reset circuit 25 and the second reset circuit 25 will generate a second reset signal anytime the second indication signal disappears. Thus, even if the alarm output 22 has generated an alarm signal, and an alarm 26 has been turned on, the second reset signal generated by the second reset circuit 25 will turn off the second alarm initiation signal which will turn off the alarm output 22 causing the alarm signal to disappear and turn off the alarm 26. Similarly, the disappearance of the first indication signal will cause the first reset circuit 21 to generate a first reset signal that will turn off the first alarm initiation signal, which will turn off the alarm output 22 and cause alarm output 22 to shut off the alarm signal, thus causing the alarm 26 to shut off.

It can be appreciated that it is not necessary to shut off the alarm once it has been generated. However, in a preferred embodiment, the alarm will be reset whenever the fluid flow indication signal returns to a value within the normal operating range.

Figure 2:
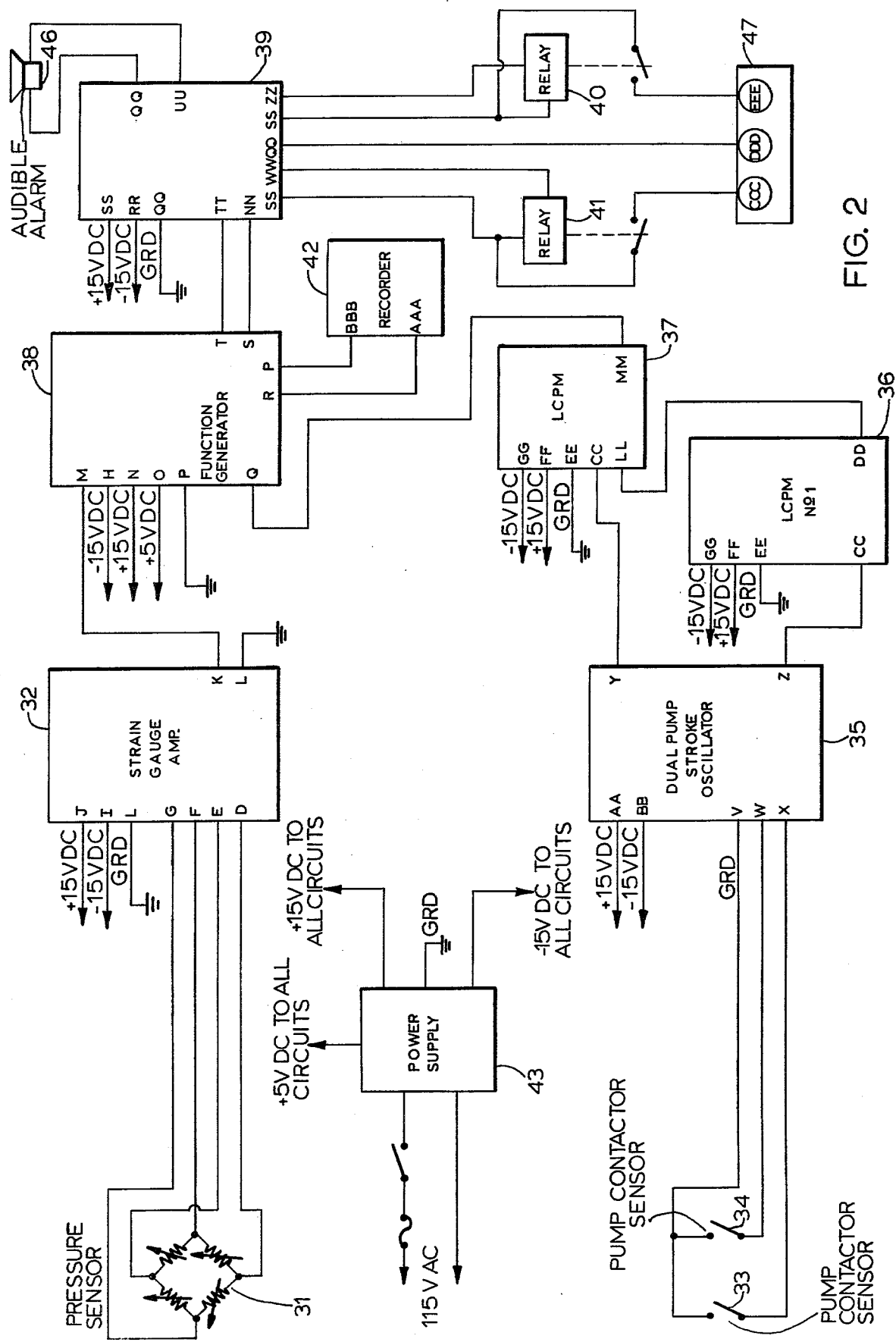
FIG. 2 is a block diagram of the system which may be used in the environment of FIG. 1.

Referring more particularly to FIG. 2, a preferred embodiment of the invention is shown in block diagram form. In FIG. 2 the pressure sensor 31 is a strain gauge. The pressure sensor 31 will correspond to the third transducer 3 in FIG. 1A. It can be appreciated that any transducer that gives a signal related to pressure may be used.

The purpose of the pressure sensor is to measure the pressure of a drilling fluid as it is pumped into a hole. In a preferred embodiment, the pressure sensor may be a foil-type strain-gauge type pressure transducer. Such a pressure sensor operates under the principle that the resistance of a foil gauge varies linearly with strain. When substantially permanently glued to a "dome" of a pressure housing, the foil gauge stretches with the dome under pressure. The stretch of the dome is slight, usually less than one percent. Therefore, the gauge is normally placed with three others in a Wheatstone bridge arrangement which is powered by any source delivering from five to ten volts direct current. The Wheatstone bridge arrangement is balanced by external potentiometers for a zero level reading at zero pressure. In a preferred embodiment, when the foil resistance changes in proportion to pressure, the unbalance of the Wheatstone bridge arrangement is sensed and amplified. The amplified signal becomes a second input signal to a function generator 38. In a preferred embodiment, a Tyco model AB 5000 transducer manufactured by Tyco Instruments, Division, 223 Crescent Street, Waltham, Mass. 02154, may be used.

In FIG. 2 it may be seen that the pressure sensor is connected to the strain gauge amplifier 32. The strain gauge amplifier 32 in a preferred embodiment is an NL INDUSTRIES, Part No. 72-83.

It will be appreciated that any amplifier that amplifies the signal from a pressure sensor to a convenient level for the function generator 38 may be used. The strain gauge amplifier 32 is connected to the function generator 38 as shown in FIG. 1.

Figure 5:
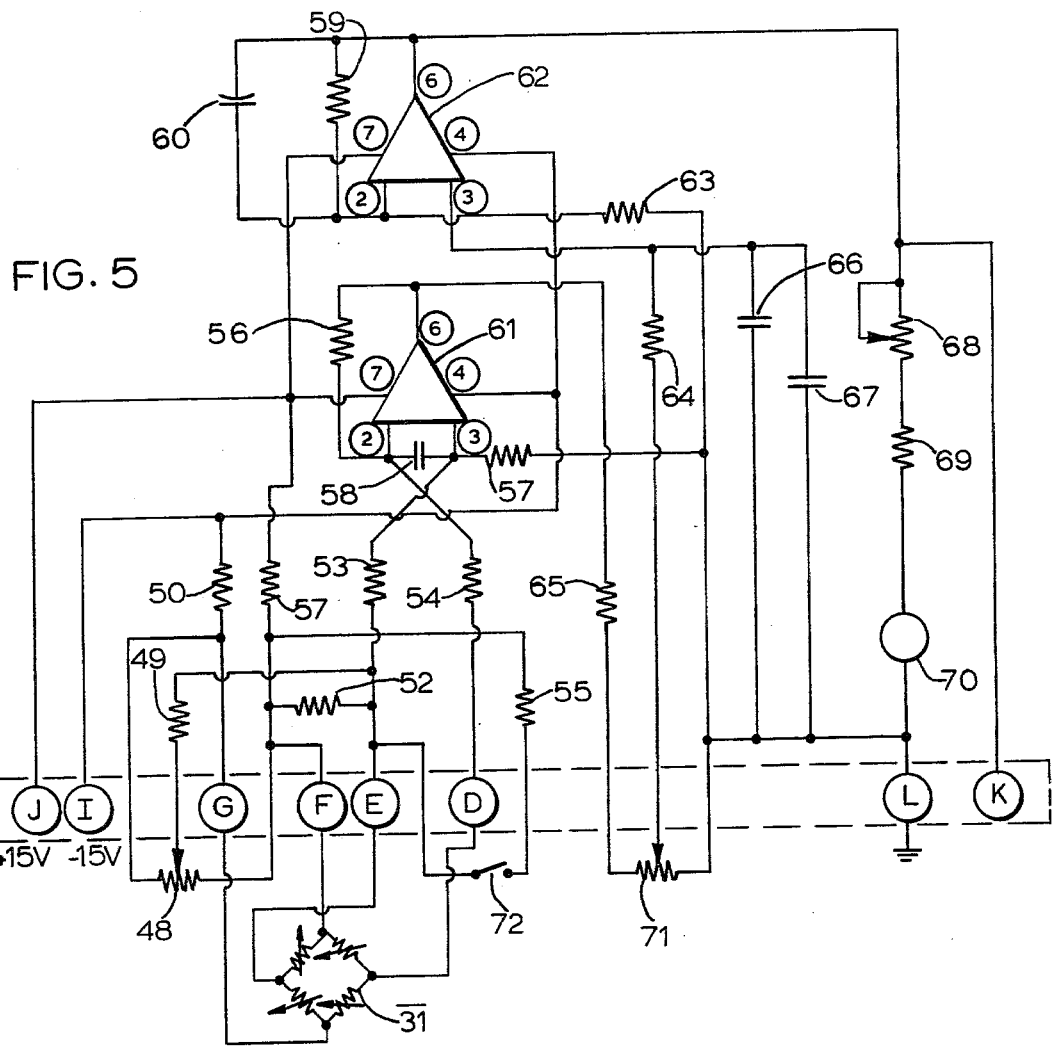
FIG. 5 is a schematic of the strain gauge amplifier shown in FIG. 2.

A schematic diagram for a preferred embodiment of the strain gauge amplifier 32 is shown in FIG. 5. A first pump contactor sensor 33 and a second pump contactor sensor 34 are connected to a dual pump stroke oscillator 35. The pump contactor sensor 33 is essentially a switch that makes and breaks a connection in step with the pump strokes of a pump with which the sensor is associated. In a preferred embodiment, a micro switch #201LS10 (Harrison) is utilized in the first pump contractor sensor 33 and the second pump contractor sensor 34. The first pump contactor sensor 33 may correspond to the first transducer 1, shown in FIG. 1A.

The second pump contactor sensor 34 in FIG. 2 is similarly a switch that makes and breaks in step with the pump strokes of a mud pump. The second pump contactor sensor 34 corresponds to the second transducer 2, shown in FIG. 1A. It can be appreciated that any transducer that produces a signal related to the pumping action may be used. In a preferred embodiment, the first pump contactor sensor 33 and the second pump contactor sensor 34 are both NL INDUSTRIES Part No. 97-18.

Figure 4:
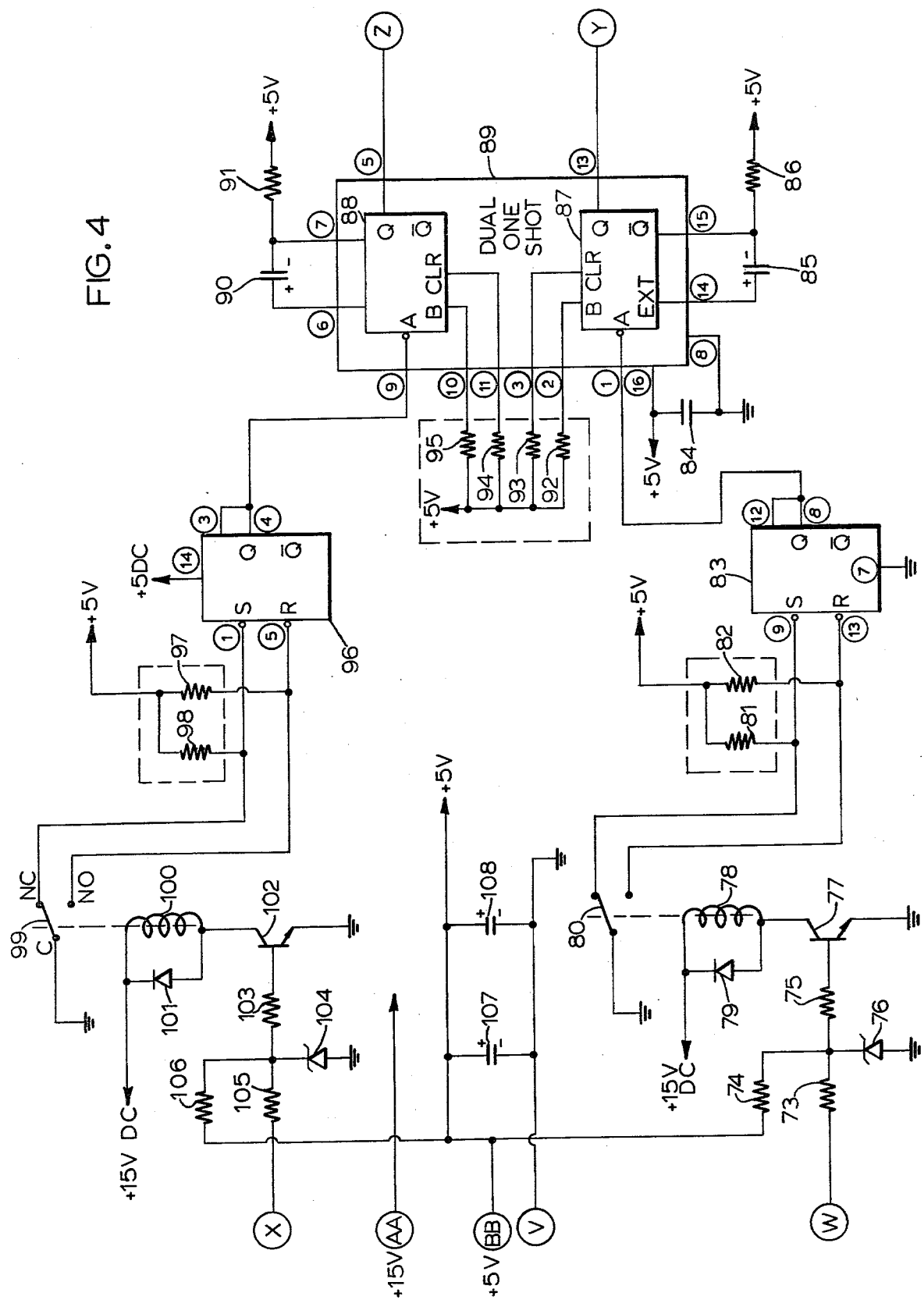
FIG. 4 is a schematic of the dual pump stroke oscillator shown in FIG. 2.

The pump contactor sensor 34 and the pump contactor sensor 33 are connected to the dual pump stroke oscillator 35. A schematic diagram of the dual pump stroke oscillator 35 is shown in FIG. 4. The dual pump stroke oscillator produces an output that varies in step with the pump contactor sensor 34 and the pump contactor sensor 33. In a preferred embodiment, the dual pump stroke oscillator 35 is an NL INDUSTRIES Part No. 72-121.

The dual pump stroke oscillator 35 produces a signal that substantially gives an indication of the number of counts per unit of time of the pumping strokes. It can be appreciated that any circuit that produces a signal that indicates the number of pump strokes per unit of time could be utilized. It will be appreciated that, with certain transducers now known to those skilled in the art or transducers later developed, the dual pump stroke oscillator 35 may be unnecessary.

Figure 7:
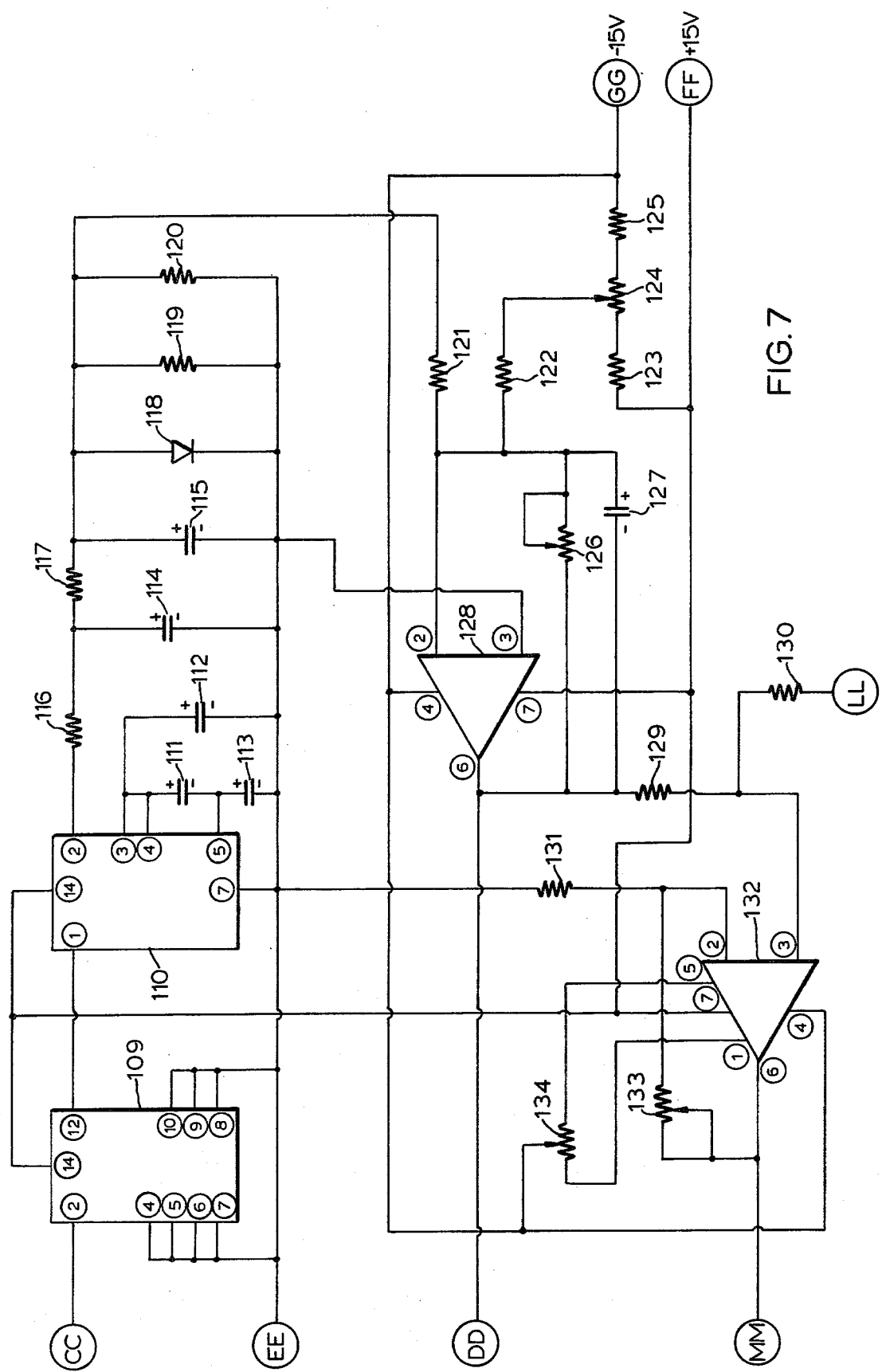
FIG. 7 is a schematic of the LCPM circuits shown in FIG. 2.

The dual pump stroke oscillator 35 produces two outputs. The first output from the dual pump stroke oscillator 35 is fed into a first linear counts per minute (LCPM) circuit 37. The second output from the dual pump stroke oscillator 35 is fed into a second linear counts per minute (LCPM) circuit 36. The first LCPM 37 is the same circuitry as the second LCPM 36. FIG. 7 is a schematic diagram of both first the LCPM circuit 37 and the second LCPM circuit 36.

The output from the dual pump stroke oscillator 35 is essentially a signal that has a substantially constant magnitude whose frequency varies in relation to the rate of pumping. the second LCPM 36 responds to the second output of the dual pump stroke oscillator 35 and transforms the signal into a signal whose magnitude varies in relation to the rate of pumping. Thus is can be appreciated that the second LCPM 36 functions as a frequency-to-voltage converter. It can be appreciated that any network that transforms the second output from the dual pump stroke oscillator 35 into a signal whose magnitude varies in proportion to the rate of pumping could be utilized. In the embodiment disclosed, the second LCPM 36 is NL INDUSTRIES Part No. 70-228-08.

The second LCPM 36 generates a signal that is fed into the first LCPM 37. The first output from the dual pump stroke oscillator 35 is fed into the first LCPM 37. This first output is essentially a signal whose magnitude substantially is constant and whose frequency varies in relation to the rate of pumping. The first LCPM 37 transforms the first output signal into a signal whose magnitude substantially is constant and whose frequency varies in relation to the rate of pumping. The first LCPM 37 transforms the first output signal into a signal whose magnitude varies in proportion to the rate of pumping. This signal is then added together with a signal from the second LCPM 36 to produce an output from the first LCPM 37 which constitutes the first input signal to the function generator 38. It will be appreciated that the first pump contactor sensor 33, the second pump contactor sensor 34, the dual pump stroke oscillator 35, the second LCPM 36 and the first LCPM 37 may all be replaced by any circuitry that develops a signal that varies in relation to the rate of pumping.

The first input signal from the first LCPM 37 and the second input signal from the strain gauge applifier 32 are fed into the function generator 38. As noted above, schematic diagram for the function generator 38 is shown in FIG. 3. The function generator 38 responds to the first input signal and the second input signal and produces a first alarm initiation signal and a second alarm initiation signal. The function generator 38 also produces a fluid flow indication signal.

A record of the value of the fluid flow indication signal over a period of time may be obtained by a recorder 42. An output for the fluid flow indication signal is thus shown connected to the recorder 42 in FIG. 2.

Figure 6:
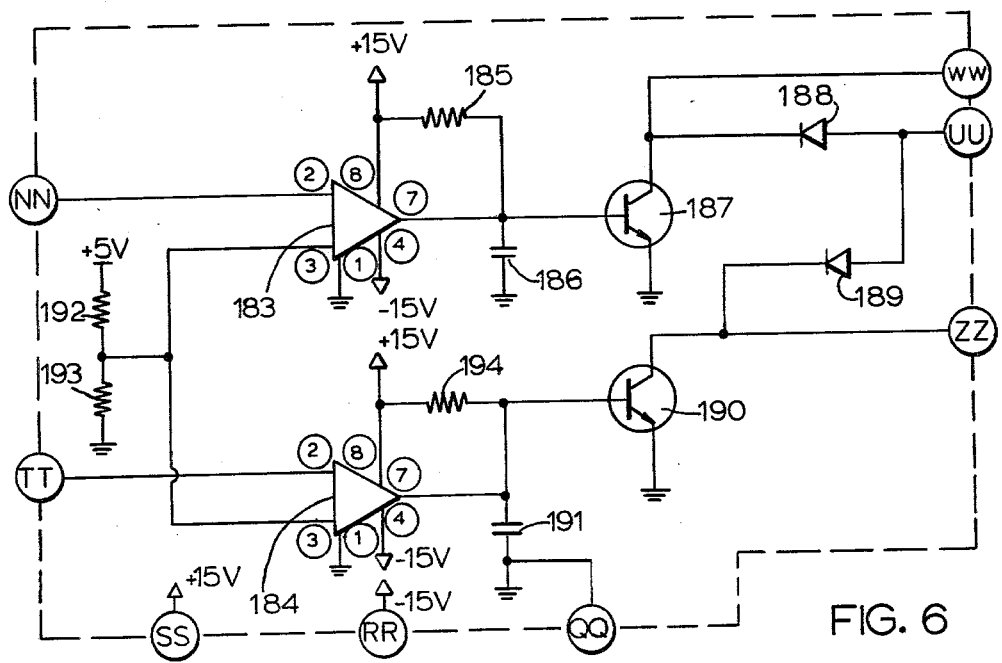
FIG. 6 is a schematic of the high-low alarm shown in FIG. 2.

The first and second alarm initiation signals are fed from the function generator 38 to a high-low alarm 39. A schematic diagram of the high-low alarm 39 is shown in FIG. 6. The high-low alarm 39 responds to the first and second alarm initiation signals and produces an alarm signal. This alarm signal may be used to actuate an alarm 46 when an abnormal fluid flow has been detected.

As shown in FIG. 2, the high-low alarm 39 may be connected to a relay for a remote alarm. The high-low alarm 39 is shown connected to a relay 40. The relay 40 may be connected to a remote alarm through a connector 47. It will be appreciated that an indication of abnormal fluid flow at a remote alarm will thus be facilitated.

The relay 40 is a preferred embodiment will be switched in the event of a restriction. The high-low alarm 39 is also connected to another relay 41, and this other relay 41 is connected to the connector 47. This other relay 41 provides a means for switching a remote alarm connected to the connector 47.

The other relay 41 will be closed whenever a washout is experienced. It can be appreciated that the connector 47 and the relay 41 provide for the utilization of a remote alarm. In a preferred embodiment, the relay 40 and the other relay 41 are Potter-Brumfield Part No. KPP11DG, 12 volt DC relays. It will be appreciated, however, that any relay that can be switched by the high-low alarm 39 may be utilized.

The relay 40 and the other relay 41 may be replaced by solid state switching circuitry. In a preferred embodiment the alarm 46 may be a Sonalert Alarm manufactured by Projects It will be appreciated that the first and second input signals may be monitored directly by conventional means.

Power is supplied to all circuits by a conventional power supply 43, which supplies +15 volts DC, −15 volts DC, and +5 volts DC. It will be appreciated that any power source capable by providing +15 volts DC, −15 volts DC and +5 volts DC may be utilized. For example, batteries may be utilized to power the invention.

STRAIN GAUGE AMPLIFIER

In the particular apparatus illustrated in FIG. 2, a strain gauge amplifier 32 is shown. A more detailed schematic of the strain gauge amplifier 32 is shown in FIG. 5. Referring more particularly to FIG. 5, a pressure sensor 31 is essentially a Wheatstone bridge arrangement where the resistences in the bridge vary in relation to the pressure of the fluid. The variation in the resistors causes the bridge to become imbalanced. The amount of imbalance varies in proportion to the pressure of the fluid in the stand pipe—(see FIG. 1A).

The signal from the pressure sensor 31 is coupled to an integrated circuit or IC 61. The IC 61 generates an output signal that varies with the variations of the transducer 31. The signal from the IC 61 is coupled through a potentiometer 71 to another IC 62. This other IC 62 further amplifies the signal and produces an output that is taken from the strain gauge amplifier at point K.

Referring to FIG. 2, point K is connected to the function generator 38 at point M. As shown in FIG. 5, point L is connected to ground, +15 volts DC with respect to ground is connected to point J, and −15 volts DC with respect to ground is connected to point I.

In the particular device shown in FIG. 5, a meter 70 is connected across the output between point L and point K through a resistor 69 and a variable resistor 68. The meter 70 gives an indication of the output from the strain gauge amplifier, and the variable resistor 68 can be adjusted to provide a predetermined full scale deflection from the meter 70. The resistor 69 serves as a current limiting resistor to prevent the meter 70 from drawing too much current. It will be appreciated that the meter 70, the resistor 69 and the variable resistor 68 are used to monitor the output of the strain gauge amplifier and can be removed without substantially affecting its operation.

A switch 72 is used for calibration purposes. By closing the switch 72, a variable resistor 48 may be adjusted to give a zero output at point K under conditions of zero pressure upon the transducer 31. This compensates for an imperfection in the transducer 31 that may result from an imbalance in the resistances forming the Wheatstone Bridge arrangement when zero pressure is applied to the transducer 31. The potentiometer 71 facilitates the adjustment of the gain of the other IC 62.

Adjustment of the potentiometer 71 will vary the range of voltages appearing between point L and point K for any corresponding pressure being sensed by the transducer 31. A first capacitor 66 and a second capacitor 67 affect the damping of the signal that is coupled from the IC 61 to the other IC 62.

The first and second capacitors 66 and 67 serve to smooth out any rapid fluctuations in the voltage that is applied to the ilput of the other IC 62. It will be appreciated that the first and second capacitors 66 and 67 may be combined into a single capacitor having a value equal to the sum of the value of the first capacitor 66 and the value of the second capacitor 67. It will be appreciated that the value of the second capacitor 67 and the value of the first capacitor 66 can be adjusted to provide more or less damping for larger or smaller values of capacitance respectively.

The IC 61 and the other IC 62 are both 741 operational amplifiers of a conventional type. The capacitor 58 is connected across pin 2 and pin 3 of the IC 61. A resistor 54 is connected between the transducer 31 and pin 2 of the IC 61. A resistor 57 is connected between ground and pin 3 of the IC 61. +15 volts DC is applied to pin 7 of the IC 61; and −15 volts DC as applied to pin 4 of the IC 61. The output of the IC 61 comes off of pin 6 of the 741 operational amplifier. As shown in FIG. 5, a resistor 56 is connected between pin 2 and pin 6 of the IC 61. It will be apppreciated that many different means now known or later developed can be used to amplify the signal produced from the transducer 31. For example, a tube circuit or a transistor circuit might be substituted for the IC 61. Any differential amplifier may be substituted for the IC 61.

As shown in FIG. 5, a resistor 63 is connected to pin 2 of the other IC 62. A capacitor 60 is connected between pin 2 and pin 6 of the other IC 62. +15 volts DC is connected to pin 7 of the other IC 62; and −15 volts DC is connected to pin 4 of the other IC 62. A resistor 64, the first capacitor 66 and the second capacitor 67 are all connected to pin 3 of the other IC 62. The output of the IC 62 is taken off the pin 6 and is connected to point K. It will be appreciated that other means of amplifying the signal from the other IC 62 now known or later developed can be substituted for the other IC 62. For example, an transistor or tube circuit may be substituted to achieve substantially the same results. A wide variety of means capable of amplifying the signal from the other IC 62 could be employed.

As the pressure of the fluid being pumped varies, the resistances in the third transducer 31 will vary. The third transducer 31 may be four foil-type strain gauges connected to form a Wheatstone Bridge arrangement. Each foil-type strain gauge serve as a sensing element that varies in resistance in proportion to the change in strain caused by the applied pressure. Thus, when external power is applied to two legs of the bridge, a differential voltage appears between the opposite two legs which is proportional to the pressure. The Wheatstone Bridge configuration permits close coupled temperature compensation within the bridge that minimizes temperature drift in an adverse temperature environment.

It will be appreciated that the third transducer 31 may be replaced by any strain gauge and the strain gauge amplifier maybe replaced by a conventional amplifier. Power is applied to the third transducer 31 between point G and point F. A differential voltage appears between the point D and the point E that is proportional to the pressure.

The IC 61 essentially functions as a differential amplifier to amplify the differential voltage. The IC 61 produces a signal at pin 6 that varies in relation to the pressure being applied to the third transducer 31. This signal, coupled through a coupling resistor 65, flows through the potentiometer 71 and a coupling resistor 64 to pin 3 of the other IC 62. The other IC 62 amplifies the signal and produces a signal at pin 6 that varies in proportion to the variations in pressure being applied to the transducer 31. The output from the other IC 62 is then taken off at point K.

The strain gauge amplifier circuitry is employed to raise the level of the weak signal being generated by the third transducer 31 to a magnitude that may be easily manipulated by the function generator 38 shown in FIG. 2. It will be appreciated that other conventional means now known or later developed may be employed to achieve substantially the same result.

In a preferred embodiment of the strain gauge amplifier illustrated in FIG. 5, the values and types of the components utilized may be as follows:
resistors 53, 54 and 63: 4.99 Kohms
resistor 64: 20 Kohms;
resistor 59: 200 Kohms;
resistor 56: 357 Kohms;
resistor 50 and 51: 365 ohms;
resistor 49: 10 Kohms;
resistor 52: 8.25 Kohms;
resistor 55: 51.1 Kohms;
resistor 65: 150 Kohms;
resistor 69: 9.3 Kohms;
resistor 57: 357 Kohms;
potentiometer 71: 10 Kohms, 10 turn;
potentiometer 48: 15 Kohms;
potentiometer 68: 1 Kohms;
capacitor 58: 0.005 microfarads;
capacitor 66: 0.01 microfarads, 50 volts;
capacitor 67: 10 microfarads, 25 volts;
capacitor 60: 0.47 microfarads, 50 volts;
switch 72: single pole, single throw;
meter 70: 0 to 1, milliampere meter;
IC 61 and IC 62: 741 operational amplifiers.

The circled numbers shown in all figures indicate the pin number to which the connection shown should be connected.

DUAL PUMP STROKE OSCILLATOR

In FIG. 2, the dual pump stroke oscillator 35 is shown. The pump contact sensor 34 is connected between point V and point W, and the pump contactor sensor 33 is connected between point V and point X. In FIG. 4, a first pump contactor sensor acts as a switch between point X and point V that makes and breaks in step with a rate of pumping. This switching action causes a transistor 102 to conduct and not conduct (switch "on" and "off") in step with the rate of pumping. This causes a relay 100 to switch a switch 99 back and forth. This causes a flip-flop 96 to change state in step with the rate of pumping. The output of the flip-flop 96 is fed into a flip-flop 88 which essentially functions as a "one shot" switch. The output of the flip-flop 88 is fed to point Z.

Thus the first pump contactor sensor which makes and breaks between point V and point X in step with the rate of pumping produces a signal at point Z that essentially turns off and on in step with the rate of pumping of a first pump. It will be appreciated that this produces a signal at point Z whose magnitude is substantially constant and whose frequency varies in proportion to the rate of pumping of the first pump.

More particularly, as the first pump contactor sensor makes and breaks between point V and point X on FIG. 4, a resistor 105 is switched to ground every time the first pump contactor sensor closes. When the resistor 105 is switched to ground, it effectively forms a voltage divider with a second resistor 106.

As can be seen in FIG. 4, the resistor 106 is connected between point BB and the resistor 105. +5 volts DC is supplied at point BB, thus the 5 volt drop between point BB and ground is divided between the resistor 106 and the resistor 105. Because the magnitude of the resistor 105 is relatively low compared with the resistor 106, the voltage drop across the resistor 105 will be relatively small. This serves to reduce the voltage between the base and the emitter of the transistor 102 causing the transistor 102 to cut off. Thus, the relay 100 will open and the switch 99 will swich to its normally closed position.

When the first pump contactor between points V and X opens, the resistor 105 will be effectively taken out of the circuit. The voltage across a zener diode 104 will then rise. This causes the transistor 102 to conduct sufficient current to energize the relay 100 and cause the switch 99 to close. The switch 99 thus switches to close its normally open contacts.

This process repeats itself each time the first pump contactor connected between points V and X makes and breaks. Thus the circuitry shown by the resistor 105, the resistor 106, the resistor 103, the zenier diode 104, the transistor 102, the relay 100 and the diode 101 effectively isolates the rest of the circuit from first pump contactor sensor. It can be appreciated that conventional means now known to those skilled in the art and other means later developed may be used to isolate the signal from the first pump contactor sensor and to detect the switching action of said first pump contactor sensor.

The switch 99 operates to alternately switch a resistor 98 and a resistor 99, respectively, to ground. +5 volts is alternatively applied to the S and the R inputs respectively of a flip-flop 96 by the switch 99. This causes the flip-flop 96 to switch back and forth so that the Q output is alternately high and low. This causes an alternately high and low signal to be applied to the A input of a flip-flop 88.

Each time the flip-flop 96 makes a complete cycle, the flip-flop 88 will generate a single pulse that will appear at Z. Thus the flipflop 96 serves to generate a signal that turns on and off in step with said pump contactor sensor and the flip-flop 88 serves to produce a "bounceless" pulse for each cycle that the flipflop 96 goes through. Thus the signal ouput at point Z will consist of a series of pulses the number of which will correspond with the number of pump strokes of the firsr pump 1 associated with the first pump contactor sensor.

In a like manner, the second pump contactor sensor connected between point V and point W will produce a similar output at point Y in a similar manner.

The overall function of the dual pump stroke oscillator is substantially to oscillate in relation to the pump strokes and produce a signal at point Z and point Y with a frequency that corresponds to the number of pump strokes of the first pump 1 and the second pump 2, respectively.

It can be appreciated that when the switch 99 is in the position shown in FIG. 4, the voltage drop across the resistor 98 is 5 volts. Thus the S input of the flip-flop 96 is substantially at ground potential.

Since the resistor 97 is not connected to ground when the switch 99 is in the position shown in FIG. 4, relatively little current flows through the resistor 97. Thus essentially +5 volts appears at the R input of the flip-flop 96 when the relay 100 is energized.

When the switch 99 switches to the other position, (closing the normally open contacts), current will flow through the resistor 97 and the entire 5 volts will be dropped across the resistor 97. In that case the R input of the flip-flop 96 will drop to ground potential. The resistor 98 will no longer have one end connected to ground. Thus little current will flow through the resistor 98 and the full 5 volts will appear at the S input of the flip-flop 96. This will cause the flip-flop 96 to change states as the relay 100 energizes in step with the pump contactor sensor connected between point X and point V.

The switch 99 will alternately switch back and forth. As the switch 99 switches back and forth, the S and R input of the flip-flop 96 will alternately each "see" 5 volts and ground. Thus, the flip-flop 96 will change states in step with the switching action of the switch 99.

The Q output, therefore, will be alternately high and low. This output applied to the A input of the flip-flop 88 will cause a pulse to appear at the Q output of the flip-flop 88 every time the flip-flop 96 goes throgh a cycle.

Similarly, the circuitry connected between point W and point Y, shown in FIG. 4, operates in substantially the same manner.

It can be appreciated that any circuit that produces an output that varies in frequency in relation to the rate of pumping could be substituted for the dual pump stroke oscillator shown. Many devices now known or later developed may accomplish essentially the same result.

In a preferred embodiment illustrated in FIG. 4, the values and types of the components may be as follows.
resistor 105 and resistor 73; 100 ohms;
resistors 106 and 74: 2.67 Kohms;
resistor 103 and 75: 1 Kohm;
capacitor 107: 15 microfarads, 16 volt DC;
capacitor 108: 0.1 microfarads, 10 volt DC;
capacitor 84: 0.1 microfarads, 10 volt DC;
capacitor 85: 10 microfarads;
diodes 101 and 79: 1N4004;
zenier diodes 104 and 76: ICT-5
transistors 102 and 77: 2N3904;
capacitor 90: 10 microfarads;
resistors 81, 82, 98, 97, 95, 94, 93 and 92: 4700 ohms;
IC 96 and IC 83: 7400;
IC 89: 74221.

The circled numbers in all of the drawings indicate the pin numbers where the connection shown should be connected.

A resistor 91 in a preferred embodiment is substantially equal to 20 Kohms. In a preferred embodiment, a resistor 86 is substantially equal to 16.9 Kohms. The resistors 91 and 86 may be adjusted to effect the timing of the output of the flip-flops 88 and 87. The relays 100 and 78 may be any 12 volt DC relays capable of operation with the transistors 102 and 77, respectively, that have single pole, double-throw contacts. In a preferred embodiment, the flip-flop 96 and the flip-flop 83 are both on a single 7400 integrated circuit.

LINEAR COUNTS PER MINUTE CIRCUIT

In FIG. 2, two linear counts per minute (LCPM) circuits are shown: a first LCPM 37 and a second LCPM 36. Both of these circuits have identical schematic diagrams. A detailed schematic for both LCPM circuits is shown in FIG. 7. As shown in FIG. 2, the output of dual pump stroke oscillator 35 is connected to the CC input of the second LCPM 36. Likewise, the Y output of dual pump stroke oscillator 35 is connected to the CC input of the first LCPM 37. Referring to FIG. 7, the input for both LCPM's comes in at point CC. Point EE is at ground potential. Input CC is fed to a IC 109, the output of the IC 109 is fed to an IC 110.

These two integrated circuits, in cooperation with the resistors, capacitors and diode that follow, operate essentially as an integrator. These components serve to convert the signal from the dual pump stroke oscillator, which varies in frequency in relation to the pumping rate, into a signal whose magnitude varies in proportion to the rate of pumping. This circuitry then essentially operates as a frequency to voltage convertor.

It is desirable to increase the amplitude of the resultant output signal to a magnitude that can be processed more conveniently by the function generator. Thus, a operational amplifier 128 is used as an amplifier to amplify this signal. The output at point DD, then, represents an amplified signal that corresponds to the signal produced by the frequency-to-voltage converter, or integrator circuit.

Because two pumps are used in the drilling operation, two signals are produced by the dual pump stroke oscillator 35 shown in FIG. 2. Thus, two LCPM circuits are needed to convert the signals from the dual pump stroke oscillator 35 into two signals whose magnitude varies in proportion to the pumping rate. The function generator 38 shown in FIG. 2 requires one input signal whose magnitude is proportional to the pumping rate. Therefore, it is desirable to sum the two signals together to produce a single input signal for the function generator 38.

Thus, the output from the second LCPM 36 taken at point DD is connected to the first LCPM 37 at point LL. Referring to FIG. 7, the amplified signal from the operational amplifier 128 is summed together with the signal appearing at point LL and amplified by an operational amplifier 132. The summed output appears at point MM. Thus, referring to FIG. 2, the output at MM of the first LCPM 37 is a signal produced by summing the integrated signals from both the first and the second pump contractor sensors.

Therefore, the first input signal applied to the function generator 38 at point Q is a signal whose magnitude varies in proportion to the rate of pumping of both pumps. It can be appreciated that other methods now known or later developed may be used to accomplish substantially the same result.

In the disclosed embodiment, two pumps are used. It can be appreciated that the invention may be used with a single pump, or with a plurality of pumps. If only one pump is used, and the first pump contactor sensor 33 shown in FIG. 2 is employed to sense the pumping rate of said pump, the first LCPM circuit 37 may be eliminated and point DD on the second LCPM circuit 36 may be connected directly to point Q on the function generator 38. Ordinarily, two pumps are used in most drilling operations.

In a preferred embodiment, illustrated shown in FIG. 7, the values and types of the components may be as follows:
capacitors 113 and 112: 15 microfarads;
capacitors 115 and 114: 1,000 microfarads;
capacitor 111: 10 microfarads;
resistor 116, 20 Kohms;
resistor 117, 402 ohms;
resistors 119 and 120: 3.48 Kohms;
resistors 121 and 122: 4.9 Kohms;
resistors 123 and 125: 100 Kohms;
capacitor 127: 250 microfarads;
resistors 129 and 131: 8.06 Kohms;
potentiometers 134 and 133: 10 Kohms;
potentiometer 124: 50 Kohms;
potentiometer 126: 5 Kohms;
resistor 13: 8.06 Kohms;
diode 118: 1N5285;
IC 109: MC-666 integrated circuit,
IC 110: MC-667 integrated circuit;
operational amplifiers 128 and 132; 741 operational amplifiers.

All the capacitors shown in FIG. 7 may be electrolytic capacitors.

Referring to FIG. 7, the IC 132 is connected to the resistor 131 and the potentiometer 133 at pin 2. The IC 132 is connected to the resistor 130 and the resistor 139 at pin 3. −15 volts is applied to pin 4, and +15 volts is applied to pin 7 of the IC 132. One end of the potentiometer 134 is connected to pin 5 of the IC 132 and the other end of said potentiometer is connected to pin 1 of the IC 132. Pin 6 of the IC 132 is connected to point MM, as shown in FIG. 7.

Pin 2 of the IC 128 is connected to the resistors 121 and 122 and the capacitor 127 as shown. Pin 3 of the IC 128 is connected to ground. Pin 4 of the IC 128 is connected to −15 volts, and pin 7 of the IC 128 is connected to +15 volts. Pin 6 is the IC 128 is connected to point DD, as shown in FIG. 7.

Pin 2 of the IC 109 is connected to point CC. Pin 14 of the IC 109 is connected to +15 volts. Pins 4, 5, 6, 7, 8, 9 and 10 of the IC 109 are connected to ground, as shown in FIG. 7.

Pin 14 of the IC 110 is connected to +15 volts DC. Pin 1 of the IC 110 is connected to pin 12 of the IC 109. Pin 2 of the IC 110 is connected to the resistor 116. Pin 3 of the IC 110 is connected to pin 4 and also to the capacitor 111 and the capacitor 112. Pin 5 of the IC 110 is connected to the capacitor 111 and the capacitor 113 as shown in FIG. 7. Pin 7 of the IC 110 is connected to ground.

It will be appreciated that other means now known or later developed may be used to achieve substantially the same result as the first LCPM 37 and the second LCPM 36 shown in FIG. 2. It will be appreciated that any network responsive to a signal from the dual pump stroke oscillator 35 that generaters a voltage that varies generally linearly in response to the rate of pumping may be employed. Moreover, any transducer that can be made to produce a signal that varies in proportion to the rate of pumping and any network responsive to such a signal from said transducer that generates a voltage that varies generally linearly in response to the rate of pumping may be substituted for the first and second pump contactor sensors 33 and 34, the dual pump stroke oscillator 35, the second LCPM circuit 36 and the first LCPM circuit 37, shown in FIG. 2.

THE FUNCTION GENERATOR

As shown in FIG. 2, the function generator 38 receives a first input signal from the second LCPM circuit 37 and a second input signal from the strain gauge amplifier 32. The function generator processes the first and second input signals and produces a first and a second alarm initiation signal at point S and point T, respectively. The function generator 38 also produces a fluid flow indication signal which can be monitored at point R.

In the embodiment disclosed in FIG. 2, point R is shown connected to the recorder 42. Point P is at ground potential. The recorder 32 gives a recorded indication of the level of the fluid flow indication signal over time.

Figure 3A:
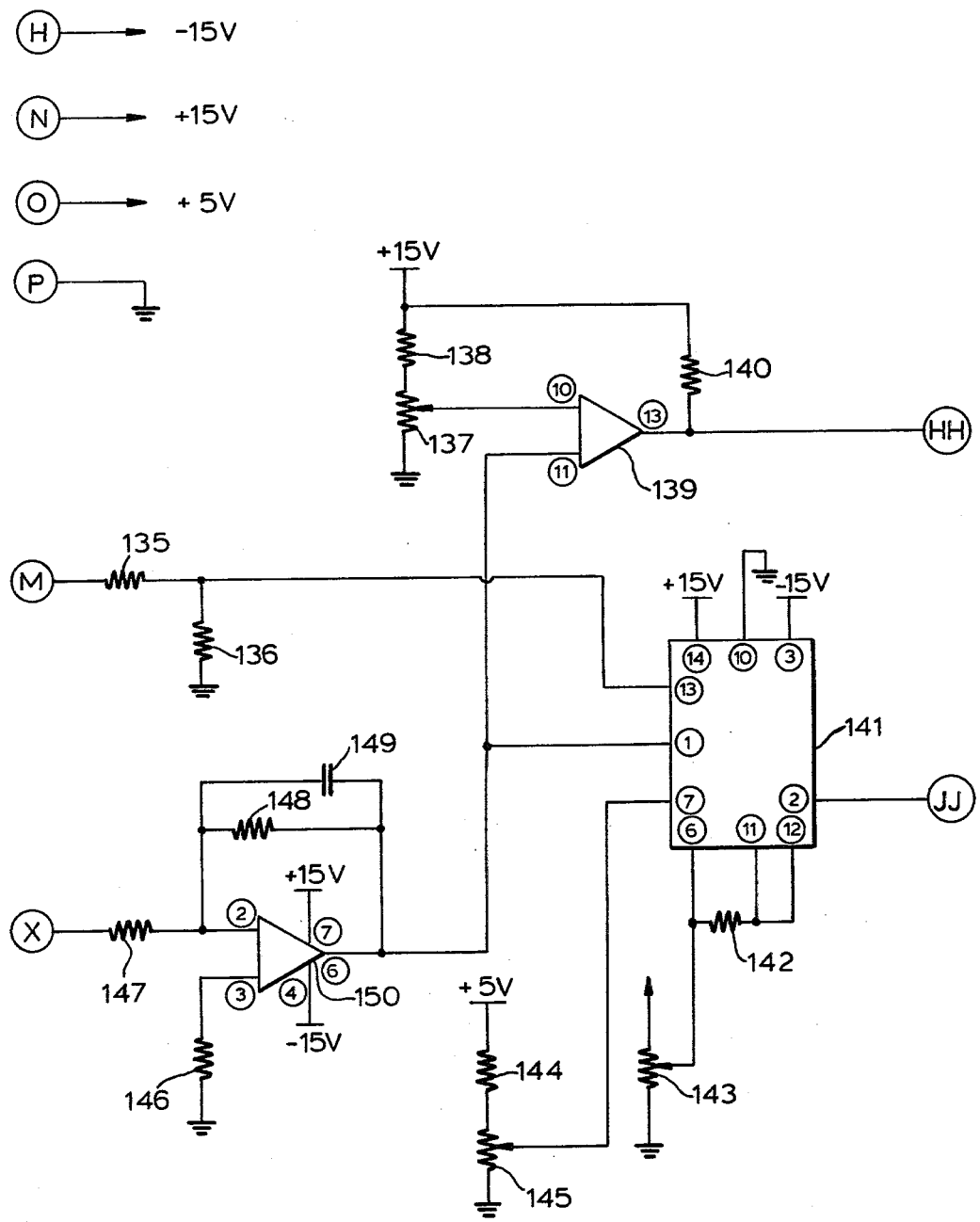
FIG. 3, shown in parts as FIG. 3A and FIG. 3B, is a schematic of the function generator shown in FIG. 2.
Figure 3B:
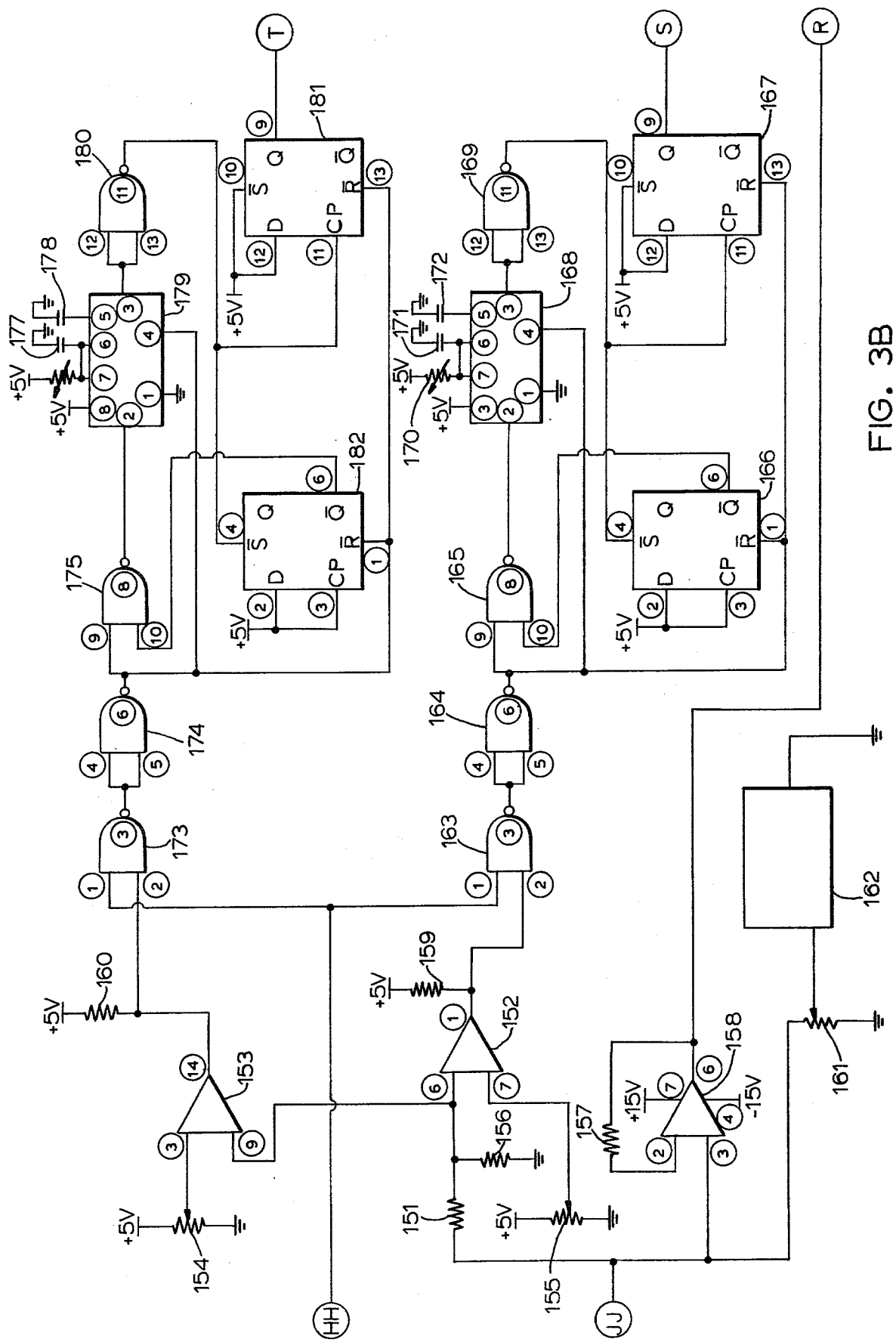

A detailed systematic of the function generator 38 is shown in FIG. 3. FIG. 3 is drawn in two parts: FIG. 3A and FIG. 3B. FIG. 3A and FIG. 3B are connected at point HH and point JJ.

Referring more particularly to FIG. 3A, the first input signal proportional to a rate of pumping fluid through the drilling string enters the circuit at point X. The signal is amplified by an IC 150 before passing to a signal generator 141.

A second input signal proportional to a pressure of the fluid being pumped enters the circuit at point M. The signal is passed to the signal generator 141. These two signals are compared to each other and the signal generator 141 cooperates with the circuitry shown in FIG. 3B to produce a first alarm initiation signal at point S and a second alarm initiation signal at point T.

Referring to FIG. 3A, the signal generator 141 is responsive to the first and second input signals and produces a fluid flow indication signal that is indicative of the relationship between said input signals. This fluid flow indication signal is fed to the second detector 153 and the first detector 152. Cooperating with the signal generator 141, the first detector 152 and the second detector 153 generate a first and a second indication signal respectively that indicate when the signal generated by the signal generator 141 is outside a predetermined range; i.e., outside normal limits. It will be appreciated that the outputs of the first detector 152 and the second detector 153 may be used directly to indicate when the relationship between the first and the second input signals respectively are outside normal limits.

In the embodiment disclosed in FIG. 3B, the first indication signal is fed into a first time delay circuit which generates a first alarm initiation signal at point S. Similarly, the second indication signal is fed into a second time delay circuit which generates a second alarm initiation at point T.

Referring to FIG. 3A, said first input signal is fed into the function generator at point X. In the present case, this signal will have a magnitude that varies in proportion to the rate of pumping in the drilling apparatus; however, the polarity of the signal will be negative. In addition, the magnitude of the signal will be relatively low in comparison to the magnitude of the second input signal for the normal range of values that both signals may be expected to have. Therefore, it is desirable to invert the first input signal and amplify it in order that it may be processed by the signal generator 141. Thus, the IC 150 amplifies and inverts the first input signal.

The second input signal is fed in at point M. Because the magnitude of the second input signal is relatively large in comparison to the magnitude of the first input signal, it is desirable to reduce the magnitude of the second input signal. This is accomplished by the voltage divider composed of a resistor 155 and a resistor 136.

The signal generator 141 transforms the first and second input signals, (as amplified, divided and inverted, as the case may be), into a fluid flow indication signal. The fluid flow indication signal is outputted at point JJ.

The fluid flow indication signal is fed into the first detector 152. The first detector 152 compares the fluid flow indication signal with a predetermined reference level. Whenever the fluid flow indication signal drops below a first predetermined reference level, the first detector 152 generates a first indication signal. It can be appreciated that the fluid flow indication signal could be inverted and the first detector 152 be changed to generate a first indication signal whenever said fluid flow indication signal goes above the first predetermined reference level.

The first indication signal gives an indication that the fluid flow indication signal has dropped below a first predetermined reference level. In the disclosed embodiment, this may be an indication of a wash-out. In a drilling apparatus, normally the pressure variations will lag behind corresponding variations in the pumping rate.

More particularly, when the pumping rate is increased, a delay is normal experienced before the pressure increases to its normal value. Likewise, when the pumping rate is decreased, a delay is experienced before the pressure reduces to its normal value for the reduced pumping rate. Thus, it is not desirable to produce an alarm signal until after a delay of a sufficiently long period of time has elapsed in order to allow the pressure time to respond to a change in the pumping rate.

Thus, the first indication signal is fed into a first time delay circuit. The first time delay circuit comprises an IC 168, a variable resistor 170, a capacitor 171, a capacitor 172, and a nand gate 169. The first indication signal starts the first time delay circuit and the first time delay circuit will, if not reset, produce a first alarm initiation signal at point S.

If a transitory aberration occurs in the fluid flow indication signal, the first indication signal will be produced for only a short period of time. As soon as the fluid flow indication signal returns to a value that is within a normal range of values, the first indication signal will disappear. In order to prevent the initiation of a false alarm for such a transitory aberration in the fluid flow indication signal, it is desirable to have a means for resetting the first time delay circuit. This is substantially accomplished by a first reset circuit.

The first reset circuit comprises a flip-flop 166 and a flip-flop 167 and a nand gate 165. The first reset circuit operates a reset the first time delay circuit when the first indication signal disappears. Thus, if a transitory aberration in the fluid flow in the drilling apparatus caused an abnormal relationship between pressure and pumping rate, the fluid flow indication signal will drop below a lower reference level and a first indication signal will be generated. However, if the fluid flow indication signal returns to a value within its normal range, the first indication signal will disappear. When the first indication signal disappears, the first reset circuit will reset the first time delay circuit and, if this occurse quickly enough, no alarm initiation signal will be generated. Therefore, this provides a measure of protection against false alarms.

In a preferred embodiment, the predetermined time delay is approximately 7 seconds. The predetermined time delay is controlled by adjustment of the values of a variable resistor 170 and a capacitor 171.

If the fluid flow indication signal exceeds its normal range of values, the second detector 153 will generate a second indication signal. In the disclosed embodiment, such a variation in the fluid flow indication signal may be an indication of a restriction.

It will be appreciated that the fluid flow indication signal could easily be inverted. In such a case, the second detector 153 would produce an indication signal that may indicate a wash-out. The first detector 152 would then produce an indication signal that may indicate a restriction. It may also be appreciated that by reversing the input connections to the first detector 152 and the input connections to the second detector 153, the first and second indication signals generated, respectively, will be generated when the fluid flow indication signal exceeds or drops below a first and a second predetermined value, respectively.

In a manner substantially the same as the first detector, the first time delay circuit and the first reset circuit, a nand gate 175, an IC 179, a nand gate 180, a flip-flop 182 and a a flip-flop 181, cooperate as a second time delay circuit and second reset circuit for the production of a second alarm initiation signal that is outputted at point T, as shown in FIG. 3B.

Referring to FIG. 3A, the first input signal at point X is amplified and inverted by the IC 150. A resistor 148 and a capacitor 149 are connected between the output of the IC 150 and the input, providing feed-back. The IC 150 is a 741 operational amplifier. The inverting input is utilized so that the output that is fed into the signal generator 141 is inverted. A resistor 147, a resistor 146, the resistor 148 and the capacitor 149 are chosen to give a gain of approximately 10.

As mentioned previously, it is described to amplify and invert said first input signal. It will be appreciated that other means now known or later developed could be used to amplify and invert said first input signal and achieve substantially the same result.

The second input signal is divided across a resistor 135 and a resistor 136. In the disclosed embodiment, the resistor 135 and the resistor 136 are 100 Kohms. this provides the function generator with a high input impedance. The first and second input signals are then fed to the signal generator 141.

Under normal drilling conditions, the pump rate and stand pipe pressure are related by the equation: $P = K$ times $Q$ raised to the m power; where $Q$ is the rate of pumping, $P$ is the pressure of the fluid being pumped, and $K$ is a constant. m is a constant generally between zero and 2, that may depend upon the amount of turbulence in the fluid flow through the pipe. The value of m will vary in proportion to the amount of turbulence in the flow.

This equation may be transformed to the form: $C = P$ times $C1$ divided by $Q$ raised to the m power, where C is a constant, P is the pressure, Q is the pumping rate, and C1 is a scaling factor. Again, m is a factor that depends upon the amount of turbulence in the flow in the pipes.

It would be desirable to implement a circuit that accepts an input whose magnitude varies in proportion to the pressure and an input whose magnitude varies in proportion to the pumping rate and which produces an output whose value is equal to the reciprocal of the magnitude of the pumping rate exponentiated by m, multiplied times the magnitude of the pressure, and then multiplied times a scaling factor. The signal generator 141 substantially accomplishes this object.

The signal generator 141 responds to the first and second input signals and produces an output at JJ in FIG. 3A magnitude of which is substantially equal to the reciprocal of the magnitude of the first input signal exponentiated by m, multiplied times the magnitude of the second input signal, which is all multiplied times a scaling factor.

The signal generator 141, therefore, produces a fluid flow indication signal. As long as the first and second input signals are related to each other in a manner consistent with the normal flow of fluid through a drilling apparatus, the fluid flow indication signal will remain constant. The scaling factor can be adjusted to place the fluid flow indication signal within a desired operating range. The scaling factor is determined by adjusting a potentiometer 145. During normal drilling operations, it is desirable to place the fluid flow indication signal at a value that falls somewhere between the upper reference level of the second detector 153 and the lower reference level of the first detector 152 illustrated in FIG. 3B.

Thus the potentiometer 145 shown in FIG. 3A affects the scaling factor of the signal generator 141. By adjusting the potentiometer 145, the fluid flow indication signal can be set within a range which falls between the upper and the lower reference level, respectively, applied by the second detector 153 and the first detector 152, shown in FIG. 3B.

Referring to FIG. 3A, the value of the exponential m is determined by a resistor 142 and a variable resistor 143. The value of m is equal to the magnitude of the resistor 142 divided by the magnitude of the variable resistor 143, plus the magnitude of the variable resistor 143 divided by the magnitude of the variable resistor 143. In the embodiment disclosed, the value of the resistor 142 is substantially 64.9 ohms, and the value of the variable resistor 143 may be varied between zero and 100 ohms. The variable resistor 143 may be a potentiometer connected as illustrated in FIG. 3A.

In a preferred embodiment, the variable resistor 143 is set to give a value of m substantially equal to 1.8.

It can be appreciated that other means now known or later developed may be utilized to establish the value of the factor m in the foregoing equation. The resistor 143 might be a transducer that varied its effective resistence in proportion to the amount of turbulence in the flow in the pipe.

The fluid flow indication signal will deviate outside its normal range of values when the pumps are shut down. Therefore, it is desirable to inhibit the alarm in some manner so that a false alarm will not be generated each time the pumps are shut down.

This object is accomplished by an IC 139 shown in FIG. 3A, and nand gates 173 and 163 shown in FIG. 3B. The first input signal is fed to the IC 139. The IC 139 generates an enabling signal when the first input signal exceeds a third predetermined value. The third predetermined value constitutes a threshold level above which the alarm generating circuitry will be enabled.

Thus the IC 139 generates an enabling signal that appears at point HH on FIG. 3A. Referring to FIG. 3B, the enabling signal is inputted into the nand gate 173 and also into the nand gate 163. The nand gates 173 and 163 operate to prevent the passage of either a first or a second indication signal, respectively, unless the first input signal exeeds a third predetermined threshold level. Because the first and second indication signals will not be passed by the nand gates 173 and 163, no first or second alarm initiation signal will be generated regardless of the output of the first and second detectors 152 and 153. Thus the alarm generating circuitry is disabled when the pumps are shut down.

More particularly, the first input signal is fed to the IC 139, shown in FIG. 3A. The IC 139 functions essentially as a comparator. A potentiometer 137 operates as a threshold level control. The voltage applied to one input of the IC 139 varies according to the setting of the potentiometer 137. Whenever the first input voltage as applied to the other input is greater than the voltage applied to the input of the IC 139 by the potentiometer 137, the IC 139 produces a "high" output. In a preferred embodiment, a "high" is essentially +5 volts, and a "low" is essentially at ground potential.

If the first input voltage drops below the voltage applied to the IC 139 from the potentiometer 137, no enabling signal will be generated by the IC 139. When no enabling signal is produced by the IC 139, no signal can pass through the nand gate 173 and the nand gate 174 shown in FIG. 3B, nor can any signal pass through the nand gate 163 and the nand gate 164 also shown in FIG. 3B. Thus, any first indication signal generated by the IC 152 shown in FIG. 3B will not reach the first time delay circuit.

In the absence of an enabling signal from the IC 139, a second indication signal generated by the IC 153 shown in FIG. 3B will not be able to pass through the nand gates 173 and 174. Thus, the second indication signal will be unable to start the second time delay circuit and no second alarm initiation signal can be generated at point T in FIG. 3B.

Referring more particularly to FIG. 3A, the potentiometer 137 and the resistor 138 are connected in series between +15 volts and ground. Thus the 15 volts is dropped across said resistors and is divided between the resistor 138 and the potentiometer 137. The voltage drop appearing between the wiper of potentiometer 137 and ground will be the voltage which is compared against the first input signal. This substantially sets a third threshold voltage.

The third threshold voltage constitutes a third predetermined reference level. No alarm signal will be generated by the invention until the first input signal, as applied to the IC 139, exceeds the voltage drop between the wiper of the potentiometer 137 and ground.

It will be appreciated that the resistor 138 and the potentiometer 137 may be replaced with a signal potentiometer, or a different configuration of resistences. Moreover, a fixed impedance may be substituted for the potentiometer 137. Any device that gives a voltage that may be compared with the first input voltage in order to substantially set a threshold level below which the alarm circuitry will be disabled may be substituted.

The IC 139 shown in FIG. 3A has its output connected to point HH. When the first input signal is less than the voltage between the wiper of the potentiometer 137 and ground, the output of the IC 139 will be at substantially ground potential, or "low." Thus, 15 volts will be dropped across a resistor 140; and the voltage between point HH and ground will be substantially zero.

Referring to FIG. 3B, a low signal at point HH will produce a high output at the nand gate 173 and will also produce a high output at the nand gate 163. The nand gate 174 has both of its input terminals tied together and connected to the output of the nand gate 173. The nand gate 174 thus functions as an inverter. Consequently, a high output from the nand gate 173 will produce a low output from the nand gate 174.

Because the nand gate 173 will produce a high output regardless of the signal applied by the IC 153, the output of the nand gate 174 will be low regardless of the output of the IC 153. Thus, even if the fluid flow indication signal exceeds the reference level of the IC 153 and causes the generation of an output from the IC 153, no second indication signal will be generated to start the second time delay circuit. Consequently, no second alarm signal initiation will be generated at point T.

Similarly, if the signal at HH in FIG. 3B is low, the output of the nand gates 163 will be high, regardless of the output from the IC 152. The nand gate 164 has its two inputs connected together, which are both connected to the output of the nand gate 163. The nand gate 164 thus operates as an inverter. Therefore, if the output of the nand gate 163 is high, the output of the nand gate 164 will be low.

Because the output of the nand gate 163 will be high whenever the signal at point HH is low, the output of the nand gate 164 will be low whenever the signal level at point HH is low. Thus the output of the nand gate 164 will remain low regardless of the presence of a high signal from the IC 152. If the fluid flow indication signal deviates from its normal range of values when the signal at HH is low, a signal generated by the IC 152 will be unable to pass to the first time delay circuit and thus will be unable to generate a first alarm initiation signal at point S.

It will be appreciated that the nand gate 174 may be replaced by an inverter. Anything that substantially changes a high signal to low signal and a low signal to a high one may be inserted into the place of the nand gate 174. Likewise, the nand gate 164 may be replaced by an inverter. Any means that serves to change a high signal to a low one or a low signal to a high signal may be used to replace the nand gate 164 and the nand gate 174.

It will be appreciated that the nand gate 173 and the nand gate 174 may be replaced by a single and gate. Likewise, it will be appreciated that the nand gate 163 and the nand gate 164 may be replaced by a single and gate.

In the embodiment disclosed, two 7400 integrated circuits are utilized. These integrated circuits have four nand gates each on a single chip. For convenience purposes, the nand gates 163, 174, 173 and 174 which appear on a 7400 integrated circuit were utilized in a preferred embodiment.

Referring to FIG. 3A, the signal generator 141 generates a fluid flow indication signal at point JJ. Referring to FIG. 3B, the fluid flow indication signal appears at point JJ. The fluid flow indication signal is coupled through a potentiometer 161, through a meter 162, to ground.

Meter 162 comprises a zero to 10 volt milliampere meter. In a preferred embodiment, a zero to 1 milliampere meter, zero to 10 volts DC, Meters and Instruments, Incorporated, model M3323 meter is used. It will be appreciated that any conventional meter that will give an indication of the level of the fluid flow indication signal may be substituted.

The potentiometer 161 may be used to adjust the range of the meter 162. The potentiometer 161 may also be used to calibrate the meter 162 by limiting the current through it. It will be appreciated that the potentiometer 161 may be left out of the circuit and the meter 162 connected directly between point JJ and ground. It will be further appreciated that other conventional means for monitoring the fluid flow indication signal, now known or later developed, may be substituted for the meter 162. For example, a conventional oscilloscope may be utilized.

The meter 162 and the potentiometer 161 may be left out of the circuit entirely without substantially impairing the essential function of the invention. The meter 162 merely gives a convenient read-out of the fluid flow indication signal in order that it may be monitored.

It will be appreciated that conventional indication devices may also be connected to the first and the second input signals to monitor the levels of said signals.

Referring to FIG. 3B, a lower reference signal is developed by the voltage between the wiper of a potentiometer 155 and ground. It is desirable to produce a voltage that can be compared against the fluid flow indication signal and which can be used to generate a signal whenever the fluid flow indication signal drops below the lower reference voltage. Thus the potentiometer 155 is employed to supply such a lower reference voltage.

It is also desirable to develop an upper reference level voltage that can be compared with the fluid flow indication signal by circuitry which will produce a signal whenever the fluid flow indication signal exceeds the upper reference level voltage. Such an upper reference level voltage is developed between the wiper of a potentiometer 154 and ground. The voltage appearing between the wiper of the potentiometer 154 and ground is compared with the fluid flow indication signal by the IC 153 and a signal is produced by the IC 153 whenever the fluid flow indication signal exceeds the voltage between the wiper of potentiometer 154 and ground.

It will be appreciated that other means now known or later developed may be substituted for the potentiometer 154 and the potentiometer 55. For example, a fixed voltage divider, or a variable voltage source may be substituted for the potentiometer 154 or the potentiometer 155, or both.

In the embodiment disclosed in FIG. 3B, the potentiometer 154 is connected between +5 volts and ground. The potentiometer 155 is also connected between +5 volts and ground. Thus, the upper reference level voltage cannot be greater than +5 volts. In a preferred embodiment, the fluid flow indication signal is adjusted to a level of approximately 5 volts.

Therefore, it is desirable to reduce the magnitude of the fluid flow indication signal so that it will fall between zero and +5 volts. In order to accomplish this object, a voltage divider is inserted between point JJ and the input to the IC 152 and the IC 153. Said voltage divider comprises a resistor 151 and a resistor 156. The voltage drop between JJ and ground is divided so that part of the drop appears across the resistor 151 and part of the drop appears the resistor 156.

In a preferred embodiment, the resistor 151 and the resistor 156 are both 100K ohms. Thus, the voltage drop appearing across the resistor 156 will be substantially one-half of the voltage between point JJ and ground. In a preferred embodiment, the voltage appearing across the resistor 156 will have a nominal value of substantially 2.5 volts. The voltage appearing at the common inputs of the IC 156 and the IC 152, as shown in FIG. 3B, is equal to the voltage drop across the resistor 156.

The IC 153 functions substantially as a comparator. The IC 153 compares the fluid flow indication signal with the upper reference voltage appearing between the wiper of potentiometer 154 and ground. The IC 153 produces a low output whenever the voltage appearing between the wiper of the potentiometer 154 and ground is greater than the voltage appearing across the resistor 156 (i.e., the fluid flow indication signal). It can be appreciated that any device that functions as a comparator may be substituted for the IC 153.

When the output of the IC 153 is low, the end of a resistor 160 connected to the IC 153 will be substantially at ground potential. Because the other end of the resistor 160 is connected to +5 volts, substantially the entire 5 volts will be dropped across the resistor 160. Thus the output of the IC 153 will be substantially at ground potential, or "low".

In such an event, the output of the IC 153 coupled to the nand gate 173 will appear low. If the output of the IC 153 applied to the nand gate 173 is low, the output of the nand gate 173 will be high. The high output of the nand gate 173 applied to the nand gate 174 will produce a low output of a nand gate 174.

In such an event, the low output from the nand gate 174 will be applied to the nand gate 175, the IC 179, the reset (R) input of the flip-flop 182, and the reset (R) input of the flip-flop 181. A low output from the nand gate 174 will generate a high output from the nand gate 175.

When the voltage across the resistor 156 rises to a value greater than the voltage appearing between the wiper of the potentiometer 154 and ground, the output from the IC 153 will go high. Little or no current will flow through the resistor 160. Thus substantially the entire 5 volts will appear at the input of the nand gate 173 that is connected to the resistor 160. This will be interpreted as a "high." If the voltage at point HH is also high, then nand gate 173 will have both of its inputs high. Thus, the output of the nand gate 173 will go low.

If the output of the nand gate 173 goes low, the output of the nand gate 174 will go high. If the output of the nand gate 174 goes high, and the $\overline{Q}$ output of the flip-flop 182 is also high, the output of the nand gate 175 will go low. Thus the high to low transition at the output of the nand gate 175 signals the presence of a second indication signal.

It is desirable to have a circuit for generating a second alarm initiation signal a predetermined period of time after the positive to negative going transition at the output of the nand gate 175. This object is accomplished by the IC 179. Thus, the second time delay circuit is actuated by the high to low transistion and, unless reset, will generate a second alarm initiation signal after a predetermined period of time.

If the voltage appearing across the resistor 156 then drops to a value below the voltage appearing between the wiper of the resistor 154 and ground, the output of the IC 153 will go low. This will cause the output of the nand gate 173 to go high again, the output of the nand gate 174 to go low again, and the output of the nand gate 175 to go high again. In such a case, it would be desirable to generate a second reset signal that would reset the second time delay circuit.

Thus the output of the nand gate 174 is connected to the IC 179. When the nand gate 174 goes low, it resets the IC 179. When the nand gate 174 output goes low, it also resets the flip-flop 182 and the flip-flop 181.

It will be appreciated that other means now know or later developed may be used to accomplish essentially the same result. Any means responsive to a second indication signal that could produce a second alarm signal after a predetermined time delay may be substituted for either the first or the second time delay circuits. Furthermore, any means for resetting a second time delay circuit when the second indication signal disappears could be utilized in the place of either the first or the second reset circuits.

It is desirable to compare the fluid flow indication signal with a predetermined lower reference voltage and to generate an output when the fluid flow indication signal drops below the lower reference level. This object is essentially accomplished by the IC 152.

The IC 152 functions esentially as a comparator. The IC 152 compares the voltage across the resistor 156 and the voltage appearing between the wiper of the potentiometer 155 and ground and generates a high output whenever the voltage appearing across the resistor 156 is less than the voltage appearing between the wiper of the potentiometer 155 and ground. Thus the IC 152 essentially functions as a comparator to compare the fluid flow indication signal with a lower reference voltage and generate a signal whenever the fluid flow indication signal drops below the lower reference voltage.

It will be appreciated that any device that functions as a comparator may be substituted for the IC 152.

When the fluid flow is normal, that is, when the relationship between the pumping rate and pressure is within normal limits, the voltage across the resistor 156 will be greater than the voltage between the wiper of the potentiometer 155 and ground. The potentiometer 155 is adjusted to provide a voltage between the wiper of the potentiometer 155 and ground that is greater than the voltage across the resistor 156 for normal fluid flow. Under normal circumstances, the output of the IC 152 will be substantially at ground potential. Thus, a resistor 159 that is connected to the IC 152 will be at essentially ground potential.

Because the other end of the resister 159 is connected to +5 volts, substantially the entire 5 volts will be dropped across the resistor 159. Thus the input to the nand gate 163 from the IC 152 will be at substantially ground potential and appear as a "low."

Regardless of whether the signal at point HH is high or low, if the output of the IC 152 is low, the output of the nand gate 163 will be high. Thus the output of the nand gate 164 will be low. If the output of the nand gate 164 is low, then regardless of the $\overline{Q}$ output of the flip-flop 166, the output of the nand gate 165 will be high.

Continuing to refer to FIG. 3B, when the fluid flow indication signal drops, the voltage across the resistor 156 will also drop. When the voltage across the resistor 156 drops below the voltage appearing between the wiper of the potentiometer 155 and ground, the output of the IC 152 will go high. When the output of the IC 152 goes high, the current flowing through the resistor 159 will be small. Therefore, substantially the entire 5 volts will appear at the input to the nand gate 163 that is connected to the output of the IC 152. This +5 volts DC will be interpreted by the nand gate 163 as a "high."

In a preferred embodiment, a voltage in excess of substantially +4 volts will be interpreted as a "high" and a voltage below +1 volt will be interpreted as a "low."

If the signal at point HH is high, then the presence of a high at the input of the nand gate 163 that is connected to the IC 152 will produce a low at the output of the nand gate 163. A low at the output of the nand gate 163 will produce a high at the output of the nand gate 164. Referring to the flip-flop 16, the $\overline{Q}$ output of the flip-flop 166 is normally high. Thus when the output of the nand gate 164 goes high, the output of the nand gate 165 will go low.

It is desirable to have an apparatus that will respond to this high-to-low transition and produce an alarm initiation signal after an appropriate time delay. Such a result is accomplished by the IC 168, the nand gate 169 and the flip-flop 167.

If the fluid flow indication signal then rises again, the voltage appearing across the resistor 156 will rise. If the voltage appearing across the resistor 156 rises above the voltage apearing between the wiper of the potentiometer 155 and ground, the output of the IC 152 will go low again. If the output of the IC 152 goes low, then the output of the nand gate 163 will go high. If the output of the nand gate 163 goes high, then the output of the nand gate 164 will go low. If the output of the nand gate 164 goes low, then the output of the nand gate 165 will go high again.

It is desirable to have an aparatus for resetting a first time delay circuit if the output of the nand gate 164 goes low. This will serve to prevent the generation of a first alarm initiation signal if the output of the nand gate 164 goes low before the predetermined time delay has expired. This object is accomplished by the connection from the output of the nand gate 164 to the reset ($\overline{R}$) input of the IC 168. When the output of the nand gate 164 goes low, it resets the IC 168.

It will be appreciated that the IC 139, the resistor 140, the resistor 138, the resistor 137, shown in FIG. 3A, and the nand gate 163, the nand gate 164, the nand gate 174 and the nand gate 173, shown in FIG. 3B, may be eliminated without substantially impairing the essential operation of the invention. These components function to prevent the generation of an alarm initiation signal, and consequently the generation of an alarm signal, whenever the pumping rate goes below a predetermined threshold level. Thus, when the pumps are shut down, an erroneous alarm signal will not be generated.

Other means now known or later developed may be substituted for these components. For example, the aforementioned components may be left out and a means for shutting off power to the invention simultaneously with shutting down the pumps may be utilized. More particularly, for example, a switch that shuts off power to the pumps could also be utilized to shut off power to the invention. Additionally, the aforementioned components may be left out and any alarm generated when the pumps are shut down could be ignored.

It is desirable to have an apparatus that will respond to a transition from the nand gate 165 and produce a signal that can be used to generate an alarm initiation signal after a predetermined time delay. A first time delay circuit substantially accomplishes this object. The IC 168 and the nand gate 169 comprise the first time delay circuit. When the fluid flow indication signal drops below a predetermined lower reference level, the output of the nand gate 165 will go from high to low. The output of the nand gate 165 is connected to the IC 68. The IC 168 essentially generates a time delay is substantially a ramp voltage.

In a preferred embodiment, the IC 168 triggers on a high-to-low transition. When the IC 168 is triggered, it generates a high output voltage that is fed into the inputs of the nand gate 169. The high output voltage remains for a predetermined period of time unless the IC 168 is reset, and then goes low. When the input to the nand gate 169 goes high, the output of the nand gate 169 will go low, thus forcing flip-flop 166 to give a low output at $\overline{Q}$.

When the output of the IC 168 goes low again, it will cause the output of the nand gate 169 to go high again and the flip-flop 167 will change state on the low-to-high transistion of the nand gate 169 output. Thus the Q output of the flip-flop 167, which is ordinarily low, will go high and generate an alarm initiation signal at S.

If the output of the nand gate 169 causes the flip-flop 166 to switch, the $\overline{Q}$ output of the flip-flop 166, which is normally high, will go low. This will result in a low input to the nand gate 165, which will cause the output of the nand gate 165 to go high again. The flip-flop 166 essentially operates to change the output of the nand gate 165 high again thus enabling the IC 168 to operate properly.

If the output of the nand gate 164 goes low again, this will cause the IC 168 to reset. When the IC 168 resets, the output applied to the inputs of the nand gate 169 goes low. When the input to the nand gate 169 goes low, the output of the nand gate 169 goes high.

When the output of the nand gate 164 changes from high to low, it resets the flip-flop 166 and the flip-flop first input producing means for producing a first input signal having a magnitude and proportional to a rate of pumping fluid through a drilling string;

second input producing means for producing a second input signal having a magnitude and proportional to a pressure of fluid being pumped through the drilling string;

a threshold circuit responsive to said first input signal, for generating an enablement signal;

signal generator means responsive to said first and second input signals, for generating a fluid flow indication signal whose magnitude is substantially equal to a reciprocal of the magnitude of said first input signal exponentiated by a predetermined value, multiplied times the magnitude of said second input signal, multiplied times a predetermined scaling factor;

a first detector responsive to the enablement signal and the fluid flow indication signal, for generating a fluid indication signal;

a first reset circuit responsive to the enablement signal and the first indication signal, for generating a first reset signal;

a first time delay circuit responsive to the first indication signal and the first reset signal, for generating a first alarm initiation signal after a predetermined period of time;

a second detector responsive to the fluid flow indication signal, for generating a second indication signal;

a second reset circuit responsive to the second indication signal, for generating a second reset signal;

a second time delay circuit responsive to the second indication signal and the second reset signal, for generating a second alarm initiation signal after a predetermined period of time;

said first input producing means, said second input producing means, said first detector, said first reset circuit, said first time delay circuit being mutually cooperable and cooperable with said signal generator means to provide a first output indicative of a washout condition in the drilling string; and said second input producing means, said first input producing means, said second detector, said second reset circuit, said second time delay circuit being mutually cooperable and cooperable with said signal generator means to provide a second output indicative of a restriction condition in the drilling string.

* * * * * appreciated that in place of an alarm, conventional switching equipment adequate to shut down pumps or divert fluid flow could be employed. Such an arrangement would provide a completely automatic system for terminating drilling operations in the event of a washout or a restriction. Such a system could be conventionally reset after taking appropriate action to correct the condition downhole.

It will be appreciated that the present invention can take many forms and embodiments. The true essence and spirit of this invention are defined in the appended claims, and it is not intended that the embodiment of the invention presented herein should limit the scope hereof.

SUMMARY OF ADVANTAGES AND SCOPE OF THE INVENTION

It will be appreciated that in constructing an apparatus for monitoring fluid flow through a drilling string according to the present invention, certain significant advantages are provided.

In particular the disclosed invention provides a lightweight, easily installed, highly portable, relatively inexpensive apparatus for detecting a washout or restriction during drilling operations. The invention provides a novel method and apparatus for monitoring pressure and pumping rate to produce a fluid flow indication signal that remains constant for normal inter-variations between the pressure and the pumping rate.

The disclosed invention provides an apparatus for detecting a wash-out or restriction that does not require significant levels of skill for its proper operation. The disclosed invention provides a method and apparatus for detecting washouts or restrictions that does not require constant attention. The disclosed invention provides a method and apparatus for determining when drilling operations should be discontinued due to a washout or restriction that does not require for its operation highly skilled computer personnel or highly experienced drilling personnel.

The disclosed invention provides an apparatus for generating an alarm at a remote location a relatively long distance away from the actual drilling equipment. The disclosed invention additionally provides a convenient method and apparatus for testing for defective pumps.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the configuration, size and arrangement of parts. For example, equivalent elements or devices may be substituted for those illustrated and described herein, parts or connections may be reversed, and certain features of the invention may be utilized independently of the use of other features, all as would be apparent to one skilled in the art after having the benefit of this description of the invention.

What is claimed is:

1. An apparatus for monitoring fluid flow through a drilling string comprising:

first input producing means for producing a first input signal having a magnitude and proportional to a rate of pumping fluid through a drilling string;

second input producing means for producing a second input signal having a magnitude and proportional to a pressure of fluid being pumped;

a function generator responsive to said first and said second input signals for generating a fluid flow indication signal; and alarm signal generating means responsive to the fluid flow indication signal, for generating an alarm signal when the fluid flow indication signal is outside a predetermined range.

2. The apparatus of claim 1, wherein said first input producing means comprises:

a first transducer for generating a signal having a frequency in proportion to the rate of pumping; and a network responsive to a signal from said first transducer, for generating a first voltage that varies generally linearly in response to the rate of pumping.

3. The apparatus of claim 2, wherein said network comprises:

a frequency to voltage converter.

4. The apparatus of claim 2, further comprising:

an amplifier responsive to the first voltage, for amplifying the magnitude of the first voltage.

5. The apparatus of claim 1, wherein said second input producing means comprises:

a pressure transducer for generating a second input signal whose magnitude is proportional to the pressure of fluid being pumped; and an amplifier responsive to the second input signal.

6. The apparatus of claim 1, wherein the alarm signal generating means comprises:

a first detector responsive to the fluid flow indication signal, for generating a first indication signal; and a first alarm responsive to the first indication signal, for generating an alarm signal when the fluid flow indication signal drops below a predetermined value.

7. The apparatus of claim 6, wherein said first alarm comprises:

a first reset circuit responsive to the first indication signal, for generating a first reset signal;

a first time delay circuit responsive to the first indication signal and the first reset signal, for generating a first alarm initiation signal after a predetermined period of time; and an alarm output responsive to the first alarm initiation signal, for generating an alarm signal.

8. The apparatus of claim 1, wherein the alarm signal generating means comprises:

a second detector responsive to the fluid flow indication signal, for generating a second indication signal; and a second alarm responsive to the said second indication signal, for generating a second alarm signal when the fluid flow indication signal exceeds a predetermined value.

9. The apparatus of claim 8, wherein the second alarm comprises:

a second reset circuit responsive to the second indication signal, for generating a second reset signal;

a second time delay circuit responsive to the second indication signal and the second reset signal, for generating a second alarm initiation signal after a predetermined period of time; and an alarm output responsive to the second alarm initiation signal, for generating an alarm signal.

10. The apparatus of claim 1, wherein said function generator comprises:

signal generator means responsive to said first and second input signals, for generating a fluid flow indication signal whose magnitude is substantially equal to a reciprocal of the magnitude of said first input signal exponentiated by a predetermined value, multiplied times the magnitude of said second input signal, multiplied times a predetermined scaling factor.

11. The apparatus of claim 10, wherein said alarm signal generating means comprises:

a second detector responsive to the fluid flow indication signal, for generating a second indication signal; and a second alarm responsive to the second indication signal for generating an alarm signal when the fluid flow indication signal exceeds a predetermined value.

12. The apparatus of claim 11, wherein said second alarm comprises:

a second reset circuit responsive to the second indication signal for generating a second reset signal;

a second time delay circuit responsive to the second indication signal and the second reset signal, for generating a second alarm initiation signal after a predetermined period of time; and a second alarm output responsive to the second alarm initiation signal, for generating an alarm signal.

13. The apparatus of claim 10, wherein said alarm signal generating means comprises:

a first detector responsive to the fluid flow indication signal, for generating a first indication signal; and a first alarm responsive to the first indication signal, for generating a first alarm signal when the fluid flow indication signal drops below a predetermined value.

14. The apparatus of claim 13, wherein said first alarm comprises:

a first reset circuit responsive to the first indication signal, for generating a first reset signal;

a first time delay circuit responsive to the first indication signal and the first reset signal, for generating a first alarm initiation signal after a predetermined period of time; and a first alarm output responsive to the first alarm initiation signal, for generating an alarm signal.

15. The apparatus of claim 14, further comprising:

a second detector responsive to the fluid flow indication signal, for generating a second indication signal; and a second alarm responsive to the second indication signal, for generating a second alarm signal when the fluid flow indication signal exceeds a predetermined value.

16. The apparatus of claim 15, wherein said second alarm comprises:

a second reset circuit responsive to the second indication signal, for generating a second reset signal;

a second time delay circuit responsive to the second indication signal and the second reset signal, for generating a second alarm initiation signal after a predetermined period of time; and a second alarm output responsive to the second alarm initiation signal, for generating an alarm signal.

17. The apparatus of claim 10, wherein said first input producing means comprises:

a first transducer for generating a signal having a frequency in proportion to the rate of pumping; and a network responsive to a signal from said first transducer, for generating a first voltage that varies generally linearly in response to the rate of pumping.

18. The apparatus of claim 17, wherein said network comprises:

a frequency to voltage converter.

19. The apparatus of claim 17, further comprising:

an amplifier responsive to the first voltage, for amplifying the magnitude of the first voltage.

20. The apparatus of claim 19, wherein said network comprises:

a frequency to voltage converter.

21. The apparatus of claim 10, wherein said second input producing means comprises:

a pressure transducer for generating a second input signal whose magnitude is proportional to the pressure of fluid being pumped; and an amplifier responsive to the second input signal.

22. The apparatus of claim 21, wherein said pressure transducer comprises:

a strain gauge.

23. An apparatus for monitoring fluid flow through a drilling string comprising:

first input producing means for producing a first input signal having a magnitude and proportional to a rate of pumping fluid through a drilling string;

second input producing means for producing a second input signal having a magnitude and proportional to a pressure of fluid being pumped;

signal generator means responsive to said first and second input signals, for generating a fluid flow indication signal whose magnitude is substantially equal to a reciprocal of the magnitude of said first input signal exponentiated by a predetermined value multiplied times the magnitude of said second input signal, multiplied times a predetermined scaling factor.

24. In a method for monitoring fluid flow through a drilling string and detecting abnormal deviations in the relationship between the pumping rate and pressure, the steps of:

sensing the pumping rate and generating a proportional first input signal in response thereto;

sensing the pressure and generating a proportional second input signal in response thereto;

responding to said first and second input signals, and generating a fluid flow indication signal whose magnitude is substantially equal to the reciprocal of the magnitude of said first input signal exponentiated by a predetermined value, multiplied times the magnitude of said second input signal, multiplied times a predetermined scaling factor.

25. The method as defined in claim 24, further including the step:

responding to said fluid flow indication signal and generating an alarm signal when said fluid flow indication signal is outside a predetermined range.

26. An apparatus for monitoring fluid flow through a drilling string comprising:

UNITED STATES PATENT AND TRADEMARK OFFICE
CERTIFICATE OF CORRECTION

PATENT NO. : 4,188,624
DATED : February 12, 1980
INVENTOR(S) : Dennis H. Hochsprung, et al It is certified that error appears in the above-identified patent and that said Letters Patent are hereby corrected as shown below:

Column 1, line 45, delete "of" and insert --or--.

Column 5, line 2, delete "advantage" and insert --advantages--.

Column 5, line 48, delete "F1" and insert --Fig. 1--.

Column 7, line 14, delete "applifier" and insert --amplifier--.

Column 7, line 16, delete "applifier" and insert --amplifier--; same line, delete "applifies" and insert --amplifies--.

Column 7, line 19, delete "applifier" and insert --amplifier--.

Column 7, line 34, delete "outputted" and insert --outputed--.

Column 7, line 37, delete "outputted" and insert --outputed--.

Column 7, line 42, delete "inputted" and insert --inputed--.

Column 8, line 64, delete "rest" and insert --reset--.

Column 10, line 4, delete "tractor" and insert --tactor--; same line, delete "contractor" and insert --contactor--.

Column 10, line 42, delete "first the" and insert --the first--.

Column 11, line 11, delete "applifier" and insert --amplifier--.

Column 11, line 37, delete "is" and insert --in--.

Column 11, line 54, after "Projects" insert --Unlimited, Inc.--.

UNITED STATES PATENT AND TRADEMARK OFFICE
CERTIFICATE OF CORRECTION

PATENT NO. : 4,188,624

DATED : February 12, 1980

INVENTOR(S) : Dennis H. Hochsprung, et al

It is certified that error appears in the above-identified patent and that said Letters Patent are hereby corrected as shown below:

Column 1, line 45, delete "of" and insert --or--.

Column 5, line 2, delete "advantage" and insert --advantages--.

Column 5, line 48, delete "F1" and insert --Fig. 1--.

Column 7, line 14, delete "applifier" and insert --amplifier--.

Column 7, line 16, delete "applifier" and insert --amplifier--; same line, delete "applifies" and insert --amplifies--.

Column 7, line 19, delete "applifier" and insert --amplifier--.

Column 7, line 34, delete "outputted" and insert --outputed--.

Column 7, line 37, delete "outputted" and insert --outputed--.

Column 7, line 42, delete "inputted" and insert --inputed--.

Column 8, line 64, delete "rest" and insert --reset--.

Column 10, line 4, delete "tractor" and insert --tactor--; same line, delete "contractor" and insert --contactor--.

Column 10, line 42, delete "first the" and insert --the first--.

Column 11, line 11, delete "applifier" and insert --amplifier--

Column 11, line 37, delete "is" and insert --in--.

Column 11, line 54, after "Projects" insert --Unlimited, Inc.--

UNITED STATES PATENT AND TRADEMARK OFFICE
CERTIFICATE OF CORRECTION

PATENT NO. : 4,188,624
DATED : February 12, 1980
INVENTOR(S) : Dennis H. Hochsprung, et al.

It is certified that error appears in the above-identified patent and that said Letters Patent are hereby corrected as shown below:

Column 11, line 61, delete "by" and insert --of--.

Column 12, line 51, delete "ilput" and insert --input--.

Column 13, line 64, delete "Kohms" and insert --K ohms--.

Column 13, line 65, delete "Kohms" and insert --K ohms--.

Column 13, line 66, delete "Kohms" and insert --K ohms--.

Column 13, line 67, delete "Kohms" and insert --K ohms--.

Column 14, line 1, delete "Kohms" and insert --K ohms--.

Column 14, line 2, delete "Kohms" and insert --K ohms--.

Column 14, line 3, delete "Kohms" and insert --K ohms--.

Column 14, line 4, delete "Kohms" and insert --K ohms--.

Column 14, line 5, delete "9.3" and insert --9.53--; same line, delete "Kohms" and insert --K ohms--.

Column 14, line 6, delete "Kohms" and insert --K ohms--.

Column 14, line 7, delete "Kohms" and insert --K ohms--.

Column 14, line 8, delete "Kohms" and insert --K ohms--.

Column 14, line 9, delete "Kohms" and insert --K ohms--.

UNITED STATES PATENT AND TRADEMARK OFFICE
CERTIFICATE OF CORRECTION

PATENT NO. : 4,188,624

DATED : February 12, 1980

INVENTOR(S) : Dennis H. Hochsprung, et al.

It is certified that error appears in the above-identified patent and that said Letters Patent are hereby corrected as shown below:

Column 14, line 62, delete "swich" and insert --switch--.

Column 14, line 66, delete "zener" and insert --zenier--.

Column 15, line 6, delete "zener" and insert --zenier--.

Column 15, line 25, delete "flipflop" and insert --flip-flop--.

Column 15, line 28, delete "flipflop" and insert --flip-flop--.

Column 15, line 31, delete "firsr" and insert --first--.

Column 16, line 4, delete "throgh" and insert --through--.

Column 16, line 15, delete the period "." and insert a colon --:--.

Column 16, line 16, delete the semicolon (first occurrence) and insert a colon --:--.

Column 16, line 55, delete "a" and insert --an--.

Column 17, line 25, delete "contractor" and insert --contactor--.

Column 17, line 42, delete "shown".

Column 17, line 48, delete the comma "," and insert a colon --:--.

UNITED STATES PATENT AND TRADEMARK OFFICE
CERTIFICATE OF CORRECTION

PATENT NO. : 4,188,624
DATED : February 12, 1980
INVENTOR(S) : Dennis H. Hochsprung, et al.

It is certified that error appears in the above-identified patent and that said Letters Patent are hereby corrected as shown below:

Column 17, line 49, delete the comma "," and insert a colon --:--.

Column 17, line 62, delete the semicolon ";" and insert a colon --:--.

Column 18, line 11, delete "is" (first occurrence) and insert --of--.

Column 18, line 30, delete "generaters" and insert --generates--.

Column 18, line 57, delete "systematic" and insert --schematic--.

Column 19, line 68, delete "normal" and insert --normally--.

Column 20, line 27, delete "a" and insert --to--.

Column 20, line 37, delete "occurse" and insert --occurs--.

Column 20, line 65, delete "a" (first occurrence).

Column 21, line 10, delete "described" and insert --desirable--.

Column 21, line 17, delete "this" and insert --This--.

Column 24, line 23, delete "174" (first occurrence) and insert --164--.

UNITED STATES PATENT AND TRADEMARK OFFICE
CERTIFICATE OF CORRECTION

PATENT NO. : 4,188,624
DATED : February 12, 1980
INVENTOR(S) : David H. Hochsprung, et al.

It is certified that error appears in the above-identified patent and that said Letters Patent are hereby corrected as shown below:

Column 25, line 13, delete "55" and insert --155--.

Column 25, line 32, after "appears" insert --across--.

Column 25, line 40, delete "156" and insert --153--.

Column 26, line 41, delete "know" and insert --known--.

Column 26, line 56, delete "esentially" and insert --essentially--.

Column 27, line 13, delete "resister" and insert --resistor--.

Column 27, line 45, delete "16" and insert --166--.

Column 27, line 65, delete "aparatus" and insert --apparatus--.

Column 28, line 37, delete "68" and insert --168--; same line, after "delay" insert --that--.

Column 29, line 27, delete "capicitance" and insert --capacitance--.

Column 29, line 47, delete "nandgate" and insert --nand gate--.

Column 30, line 67, delete "pins 4" and insert --pin 4--.

Column 31, line 1, delete "poin" and insert --point--.

Column 31, line 20, after "second" insert --alarm--.

UNITED STATES PATENT AND TRADEMARK OFFICE
CERTIFICATE OF CORRECTION

PATENT NO. : 4,188,624

DATED : February 12, 1980

INVENTOR(S) : David H. Hochsprung, et al.

It is certified that error appears in the above-identified patent and that said Letters Patent are hereby corrected as shown below:

Column 31, line 25, delete "signalat" and insert --signal at--.

Column 32, line 49, delete "a diver" and insert --or divert--.

Column 37, line 20, delete "fluid" and insert --first--.

Signed and Sealed this

Nineteenth Day of August 1980

[SEAL]

Attest:

Attesting Officer

SIDNEY A. DIAMOND

Commissioner of Patents and Trademarks